US010630518B2

(12) United States Patent
Park et al.

(10) Patent No.: US 10,630,518 B2
(45) Date of Patent: Apr. 21, 2020

(54) PILOT RATIO ADAPTATION

(71) Applicant: QUALCOMM Incorporated, San Diego, CA (US)

(72) Inventors: Seyong Park, San Diego, CA (US); Renqiu Wang, San Diego, CA (US); Yi Huang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/978,965

(22) Filed: May 14, 2018

(65) Prior Publication Data

US 2018/0337810 A1 Nov. 22, 2018

Related U.S. Application Data

(60) Provisional application No. 62/507,769, filed on May 17, 2017.

(51) Int. Cl.
*H04L 27/26* (2006.01)
*H04L 5/00* (2006.01)
(Continued)

(52) U.S. Cl.
CPC ....... *H04L 27/2613* (2013.01); *H04B 7/0604* (2013.01); *H04L 1/0003* (2013.01);
(Continued)

(58) Field of Classification Search
None
See application file for complete search history.

(56) References Cited

U.S. PATENT DOCUMENTS

2008/0056118 A1 3/2008 Yu et al.
2008/0299984 A1* 12/2008 Shimomura ........ H04W 52/325
455/446

(Continued)

FOREIGN PATENT DOCUMENTS

CN 107547094 A 1/2018
WO WO2017144112 A1 8/2017

OTHER PUBLICATIONS

Ghosh A., et al., "LTE-Advanced: Next-Generation Wireless Broadband Technology", IEEE Wireless Communications, IEEE Service Center, Piscataway, NJ, US, vol. 17, No. 3, Jun. 1, 2010 (Jun. 1, 2010), pp. 10-22, XP011311803, ISSN: 1536-1284.

(Continued)

*Primary Examiner* — Anh Vu H Ly
(74) *Attorney, Agent, or Firm* — Qualcomm IP Dept.; James Hunt Yancey, Jr.

(57) ABSTRACT

Methods, systems, and devices for wireless communication are described. Pilot ratios (e.g., a ratio of pilot (or reference signal) resources to a total number of resources) may be adapted based on various properties associated with transmissions between wireless devices. For example, a wireless device (e.g., a user equipment (UE) or a base station) may use different transmission configurations for transmitting messages that include reference signals and data. Based on the transmission configuration, the wireless device may determine an adjustable pilot ratio based on the transmission configuration. In some cases, the adjustable pilot ratio may be explicitly signaled, or may be implicitly determined based on the transmission configuration. For example, a wireless device may transmit (or receive) an indication of the pilot ratio, or the wireless device may determine the pilot ratio based on a transmission configuration used for communicating with the other wireless device.

30 Claims, 18 Drawing Sheets

(51) Int. Cl.
*H04B 7/06* (2006.01)
*H04L 1/00* (2006.01)
(52) U.S. Cl.
CPC .......... *H04L 5/0048* (2013.01); *H04L 5/0076* (2013.01); *H04L 5/0092* (2013.01); *H04L 27/262* (2013.01); *H04L 27/2666* (2013.01); *H04L 27/2675* (2013.01)

(56) References Cited

U.S. PATENT DOCUMENTS

| | | | | |
|---|---|---|---|---|
| 2009/0052427 | A1* | 2/2009 | Oketani | H04L 27/261 370/347 |
| 2009/0262846 | A1* | 10/2009 | Ko | H04B 7/0408 375/260 |
| 2012/0094709 | A1* | 4/2012 | Ogawa | H04L 27/2602 455/522 |
| 2014/0153500 | A1* | 6/2014 | Duan | H04W 52/265 370/329 |
| 2015/0304130 | A1* | 10/2015 | Logothetis | H04L 1/0003 455/115.2 |
| 2016/0352405 | A1* | 12/2016 | Challa | H04W 52/28 370/329 |
| 2016/0381670 | A1* | 12/2016 | Kim | H04L 5/0048 370/329 |
| 2017/0063503 | A1 | 3/2017 | Liu et al. | |
| 2017/0126453 | A1* | 5/2017 | Montreuil | H04L 27/2613 370/329 |
| 2017/0251456 | A1 | 8/2017 | Radulescu et al. | |
| 2017/0295000 | A1 | 10/2017 | Yoo et al. | |

OTHER PUBLICATIONS

International Search Report and Written Opinion—PCT/US2018/032688—ISA/EPO—dated Aug. 21, 2018.
Yu D., et al., "Proposal for IEEE 802.16m Downlink Pilot Structure for MIMO", IEEE, Piscataway, NJ, USA, IEEE C802.16m-08/172r1, Mar. 18, 2008, XP040391789, pp. 1-44.
QUALCOMM: "Pilot Ratio Adaptation for 5G NR", Apr. 23, 2018, 7 pages.

* cited by examiner

PILOT RATIO ADAPTATION

CROSS REFERENCES

The present Application for Patent claims benefit of U.S. Provisional Patent Application No. 62/507,769 by Park et al., entitled "Pilot Ratio Adaptation," filed May 17, 2017, assigned to the assignee hereof, and expressly incorporated by reference in its entirety.

BACKGROUND

The following relates generally to wireless communication, and more specifically to adaptable pilot ratios.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Transmissions between wireless devices are often affected by noisy channel conditions and interference. In such cases, pilots (e.g., reference signals) may be inserted into messages sent from a transmitter to a receiver, where the pilots are known signals that a receiver may use to perform channel estimation to aid in decoding received messages. However, in some cases, an optimal ratio of pilot resources to the total number of allocated resources for a message may vary for different transmission configurations.

SUMMARY

The described techniques relate to improved methods, systems, devices, or apparatuses that support adaptively adjusting pilot ratios. Generally, the described techniques provide for the adaptation of pilot ratios (e.g., a ratio of pilot (or reference signal) resources to a total number of resources) based on various properties associated with transmissions between wireless devices. For example, a wireless device (e.g., a user equipment (UE) or a base station) may use various transmission configurations for transmitting messages that include reference signals and data. The various transmission configurations may include, for example, the use of different modulation and coding schemes (MCS), a number of multiple-input multiple-output (MIMO) layers, a number of antennas used, a number of allocated resource blocks (RBs), a narrowband or wideband transmission, and the like. Based on the transmission configuration, the wireless device may determine an adjustable pilot ratio based on the transmission configuration. In some cases, the adjustable pilot ratio may be explicitly signaled (e.g., by either the UE or base station), or may be implicitly determined based on the transmission configuration. For example, a wireless device may transmit an indication of the pilot ratio used for communicating with another wireless device. Alternatively, the wireless device may determine the pilot ratio based on a transmission configuration used for communicating with the other wireless device.

A method of wireless communication is described. The method may include identifying a transmission configuration for a message that includes one or more reference signals and data and determining an adjustable pilot ratio for the message based on the identified transmission configuration.

An apparatus for wireless communication is described. The apparatus may include means for identifying a transmission configuration for a message that includes one or more reference signals and data and means for determining an adjustable pilot ratio for the message based on the identified transmission configuration.

Another apparatus for wireless communication is described. The apparatus may include a processor, memory in electronic communication with the processor, and instructions stored in the memory. The instructions may be operable to cause the processor to identify a transmission configuration for a message that includes one or more reference signals and data and determine an adjustable pilot ratio for the message based on the identified transmission configuration.

A non-transitory computer readable medium for wireless communication is described. The non-transitory computer-readable medium may include instructions operable to cause a processor to identify a transmission configuration for a message that includes one or more reference signals and data and determine an adjustable pilot ratio for the message based on the identified transmission configuration.

Some examples of the method, apparatus, and non-transitory computer-readable medium described above may further include processes, features, means, or instructions for transmitting signaling that indicates the determined adjustable pilot ratio. In some examples of the method, apparatus, and non-transitory computer-readable medium described above, determining the adjustable pilot ratio comprises: receiving signaling that indicates the adjustable pilot ratio from another device. Some examples of the method, apparatus, and non-transitory computer-readable medium described above may further include processes, features, means, or instructions for determining the adjustable pilot ratio based on the received signaling.

Some examples of the method, apparatus, and non-transitory computer-readable medium described above may further include processes, features, means, or instructions for transmitting the message using the determined adjustable pilot ratio. Some examples of the method, apparatus, and non-transitory computer-readable medium described above may further include processes, features, means, or instructions for determining a frequency pattern for the one or more reference signals and the data based on the determined adjustable pilot ratio. Some examples of the method, apparatus, and non-transitory computer-readable medium described above may further include processes, features, means, or instructions for multiplexing the one or more reference signals and the data using frequency division multiplexing (FDM) in accordance with the determined frequency pattern.

In some examples of the method, apparatus, and non-transitory computer-readable medium described above, the frequency pattern comprises a comb-type pilot arrangement size. Some examples of the method, apparatus, and non-transitory computer-readable medium described above may further include processes, features, means, or instructions for determining a ratio of a reference signal length to a total message length based on the adjustable pilot ratio. Some examples of the method, apparatus, and non-transitory computer-readable medium described above may further include processes, features, means, or instructions for multiplexing the one or more reference signals and the data using virtual time division multiplexing (TDM) in accordance with the determined ratio.

Some examples of the method, apparatus, and non-transitory computer-readable medium described above may further include processes, features, means, or instructions for determining a pilot pattern for the message based on the adjustable pilot ratio. Some examples of the method, apparatus, and non-transitory computer-readable medium described above may further include processes, features, means, or instructions for transmitting the message in a first modulation symbol and a second modulation symbol, where the determined pilot pattern may be applied to both the first modulation symbol and the second modulation symbol.

Some examples of the method, apparatus, and non-transitory computer-readable medium described above may further include processes, features, means, or instructions for determining a first pilot pattern and a second pilot pattern for the message based on the adjustable pilot ratio. Some examples of the method, apparatus, and non-transitory computer-readable medium described above may further include processes, features, means, or instructions for transmitting the message in a first modulation symbol and a second modulation symbol, where the first pilot pattern may be applied to the first modulation symbol and the second pilot pattern may be applied to the second modulation symbol.

In some examples of the method, apparatus, and non-transitory computer-readable medium described above, the first pilot pattern comprises the one or more reference signals and the data, and where the second pilot pattern comprises the data. Some examples of the method, apparatus, and non-transitory computer-readable medium described above may further include processes, features, means, or instructions for transmitting the message over a plurality of symbols using the determined adjustable pilot ratio, where respective modulation symbols of the plurality of symbols comprise the one or more reference signals, the data, or a combination thereof. In some examples of the method, apparatus, and non-transitory computer-readable medium described above, a variable number of the respective modulation symbols include the one or more reference signals.

In some examples of the method, apparatus, and non-transitory computer-readable medium described above, the message comprises a one-symbol burst, a two-symbol burst, or a long burst. In some examples of the method, apparatus, and non-transitory computer-readable medium described above, the transmission configuration comprises at least a MCS, a number of MIMO layers, a number of antennas used, a number of allocated RBs, a narrowband transmission, a wideband transmission, or any combination thereof.

DETAILED DESCRIPTION

In some wireless communications systems, pilots (e.g., reference signals) may be inserted into transmissions between wireless devices to enable coherent channel estimation. For example, a demodulation reference signal (DMRS) may be multiplexed with data in a message from a transmitter to a receiver. In such cases, the DMRS may aid the receiver in estimating channel quality, and the receiver may in turn use the channel estimation to assist with demodulation and decoding of received messages. The transmitter may accordingly determine a number of time and frequency resources (e.g., resource blocks (RBs)) used to transmit the reference signals, which may be represented as a pilot ratio, or a ratio of pilot resources to the total number of resources used for a given transmission (e.g., a pilot-to-physical downlink shared channel (PDSCH) ratio).

In some cases, different transmission schemes may be used for communications between wireless devices. For instance, wireless devices may use a different number of layers for multiple-input multiple-output (MIMO) communications, or may use a different number of antennas for communicating with another wireless device, such as with single-input multiple-output (SIMO) or MIMO communications. Additionally or alternatively, the wireless device may use different modulation and coding schemes (MCSs), a different number of RBs for transmitting a message, or may utilize wideband or narrowband communications. In any event, different transmission configurations may also have different pilot ratios that are optimal for communications. That is, an unchanging pilot ratio used for all transmission configurations may not provide for efficient wireless communications.

As described herein, a pilot ratio may be flexibly adjusted for different transmission configurations used by wireless devices. In such cases, depending on properties associated with communications, such as MCS, number of MIMO layers, number of antennas, number of allocated RBs, wideband/narrowband communications, and the like, the pilot ratio may be adaptively adjusted to enable an optimal pilot ratio for different transmission configurations. In some examples, the adjustable pilot ratio may be explicitly signals by a wireless device. Additionally or alternatively, the plot ratio may be implicitly determined based on the transmission configuration used. Accordingly, the utilization of a flexible pilot ratio may enable wireless devices to adapt to various means by which signals are transmitted, and coherently use an optimal pilot ratio that suits various communications schemes.

Aspects of the disclosure are initially described in the context of a wireless communications system. Examples are also provided which describe adjustable pilot ratio configurations for different transmission bursts. Aspects of the disclosure are further illustrated by and described with reference to apparatus diagrams, system diagrams, and flowcharts that relate to pilot ratio adaptation.

Figure 1:
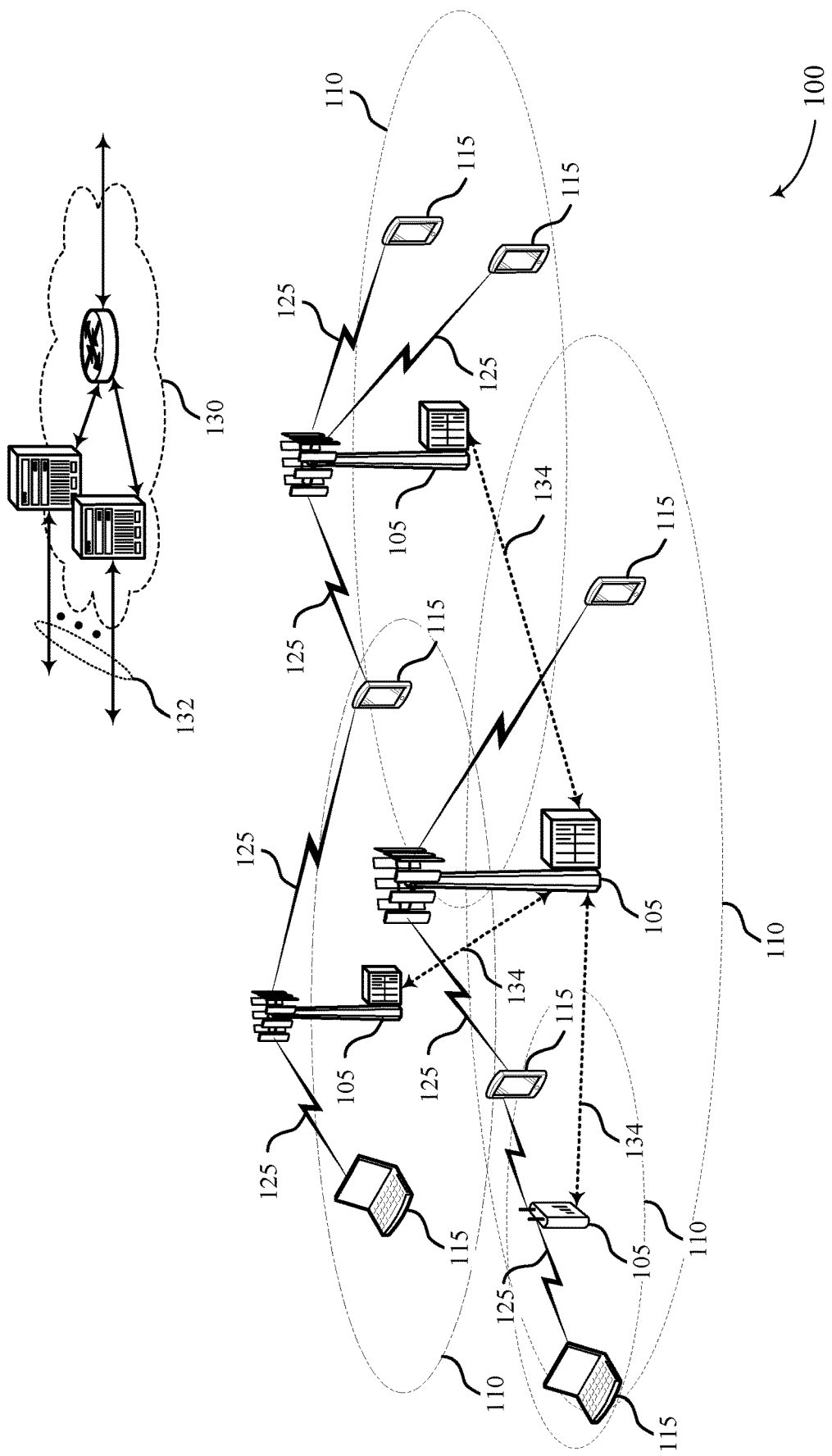
FIG. 1 illustrates an example of a system for wireless communication that supports pilot ratio adaptation in accordance with aspects of the present disclosure.

FIG. 1 illustrates an example of a wireless communications system 100 in accordance with various aspects of the present disclosure. The wireless communications system 100 includes base stations 105, user equipment (UEs) 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system may support dynamic adjustment of pilot ratios based on various parameters associated with a transmission, which may enable efficient communications between wireless devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink channel according to various techniques. For example, control information and data may be multiplexed on a downlink channel using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1). Base stations 105 may communicate with one another over backhaul links 134 (e.g., X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as a base station 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 25 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

MIMO wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and a network device or core network 130 supporting radio bearers for user plane data. At the physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix (CP) prepended to each symbol). Excluding the CP, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 kHz frequency range). A resource block may contain 12 consecutive subcarriers in the frequency domain and, for a normal CP in each orthogonal frequency-division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier,"

"component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, or 80 MHz) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

A base station 105 or a UE 115 may insert periodic pilot symbols (such as a cell specific reference signal (CRS), a demodulation reference signal (DMRS), a UE-specific reference signal (UERS), and the like) to aid in channel estimation and coherent demodulation. For example, CRS may include one of 504 different cell identities, and may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may, for example, be utilized by all UEs 115 in the coverage area 110 of the base station 105, DMRS may be directed toward specific UEs 115 and may be transmitted on resource blocks assigned to those UEs 115. DMRS may include signals on 6 resource elements in each resource block in which they are transmitted. The DMRS for different antenna ports may each utilize the same 6 resource elements, and may be distinguished using different orthogonal cover codes (e.g., masking each signal with a different combination of 1 or −1 in different resource elements). In some cases, two sets of DMRS may be transmitted in adjoining resource elements. Additional reference signals known as channel state information reference signals (CSI-RS) may be included to aid in generating channel state information (CSI). On the uplink, a UE 115 may transmit a combination of periodic sounding reference signal (SRS) and uplink DMRS for link adaptation and demodulation, respectively.

In wireless communications system 100, a UE 115 or base station 105 may adaptively adjust pilot ratios (e.g., a ratio of pilot resources (or reference signal resources) to a total number of resources) based on various properties associated with transmissions between the wireless devices. For example, a wireless device may use various transmission configurations for transmitting messages that include reference signals and data. The various transmission configurations may include, for example, the use of different MCS, a number of MIMO layers, a number of antennas used (e.g., for SIMO or MIMO communication), a number of allocated RBs, or a narrowband or wideband transmission. The wireless device may determine an adjustable pilot ratio based on the transmission configuration. In some cases, the adjustable pilot ratio may be explicitly signaled (e.g., by either the UE 115 or base station 105), or may be implicitly determined based on the transmission configuration. For example, a wireless device may transmit an indication of the pilot ratio used for communicating with another wireless device. Alternatively, the wireless device may determine the pilot ratio based on a transmission configuration used for communicating with the other wireless device.

Figure 2:
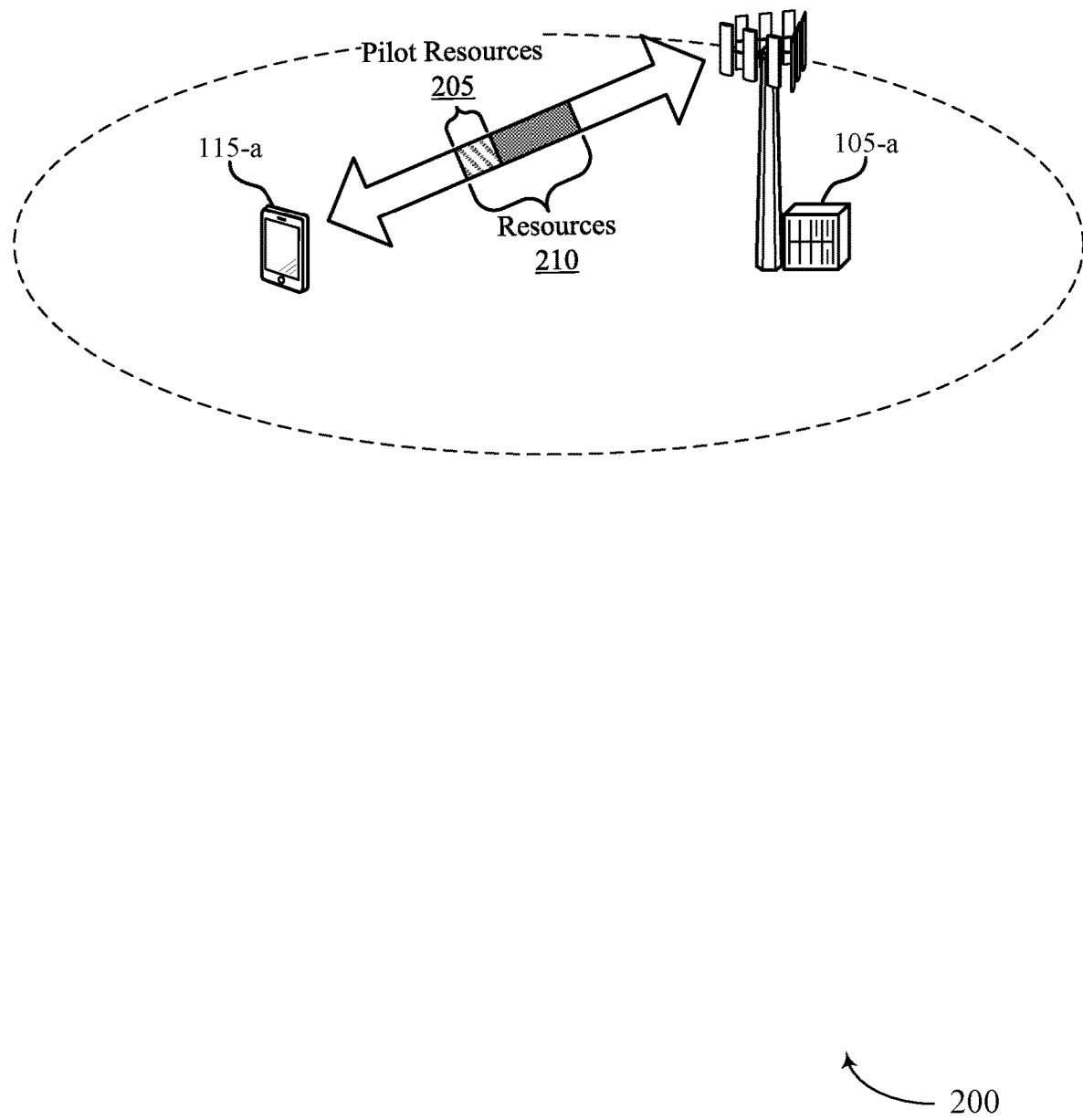
FIG. 2 illustrates an example of a wireless communications system that supports pilot ratio adaptation in accordance with aspects of the present disclosure.

FIG. 2 illustrates an example of a wireless communications system 200 that supports pilot ratio adaptation in accordance with various aspects of the present disclosure. In some examples, wireless communications system 200 may implement aspects of wireless communications system 100. Wireless communications system 200 includes multiple wireless devices, such as base station 105-*a* and UE 115-*a*, which may be examples of the corresponding devices as described with reference to FIG. 1. Wireless communications system 200 may support the use of dynamically adjustable pilot ratios for communications between UE 115-*a* and base station 105-*a*.

Communications between UE 115-*a* and base station 105-*b* may include the use of pilots (reference signals) to assist with channel estimation by each device. These pilots may be multiplexed with data and sent in messages between wireless devices. For example, the data and reference signals may be multiplexed using TDM (or virtual TDM) and FDM. The transmitting device may determine a number of time and frequency resources used to transmit the reference signals, which may be represented as a pilot ratio, or a ratio of pilot resources 205 to a total number of resources 210 used for a given message (e.g., a total number of allocated time and frequency resources).

In some examples, these wireless devices may use different transmission schemes for communications. For instance, UE 115-*a* and base station 105-*a* may use various numbers of MIMO layers, or may use a different number of antennas for communicating with each other, such as with SIMO or MIMO communications. Additionally or alternatively, UE 115-*a* and base station 105-*a* may use a different MCS for different transmissions, a different number of RBs for transmitting messages, or may utilize wideband or narrowband communications. In such cases, an optimal pilot ratio may depend on a transmission configuration utilized.

In wireless communications system 200, a pilot ratio may be flexibly adjusted for different transmission configurations used by UE 115-*a* and base station 105-*a*. In such cases, depending on properties associated with communications (such as MCS, number of MIMO layers, number of antennas, number of allocated RBs, wideband/narrowband communications, and the like) the pilot ratio may be adaptively adjusted to enable an optimal pilot ratio for different transmission configurations. In some examples, the adjustable pilot ratio may be explicitly signaled by a wireless device (e.g., signaled by UE 115-*a* to base station 105-*a*, or vice versa). Additionally or alternatively, the plot ratio may be implicitly determined based on the transmission configuration used. That is, using information associated with the transmission configuration, UE 115-*a* or base station 105-*a* may determine an adjustable pilot ratio being used for a message that is transmitted or received.

In some cases, various pilot ratios may be adaptively adjusted for different transmissions configurations. For example, one-symbol bursts may utilize pilot ratios of ½, ⅓, or ¼. In another example, messages modulated according to 64-quadrature amplitude modulation (QAM) may utilize a pilot ratio of ¼, whereas messages modulated using QPSK may utilize a pilot ratio of ½. Additionally or alternatively, for allocations of one or two RBs, the associated pilot ratio may be ½, and for larger resource block (RB) allocations (e.g., more than two RBs), the pilot ratio may be ¼. Other adjustable pilot ratios not explicitly mentioned herein may be possible.

As described in further detail below, the ratio of pilot resources 205 to the total number of resources 210 may be flexibly adjusted by modification of either a frequency pattern (such as with FDM of reference signals with data) or by adjusting a reference signal length with relation to a total length of a transmission (such as with virtual TDM). Additionally, a pilot pattern may be determined for transmitting a message using an adjustable pilot ratio, where the pilot pattern may be same across multiple modulation symbols of a short-burst, or different pilot patterns may be applied to respective modulation symbols of the short-burst. Through the use of the techniques described herein, an adjustable pilot ratio may enable UE 115-*a* and base station 105-*a* to flexibly adapt to various techniques by which signals are transmitted and coherently use an optimal pilot ratio that suits various communications schemes.

Figure 3:
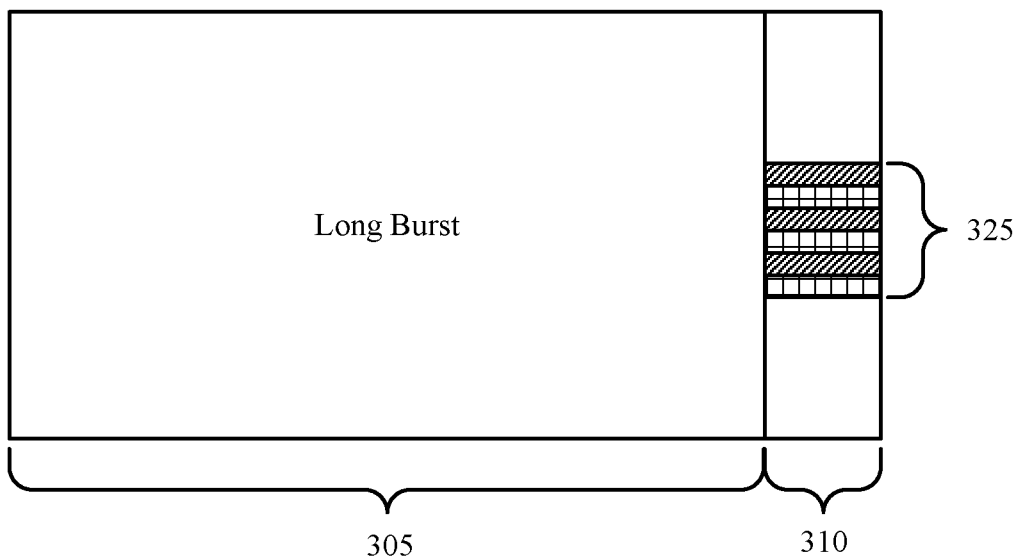
FIG. 3 illustrates an example of a message that supports pilot ratio adaptation in accordance with aspects of the present disclosure.

FIG. 3 illustrates an example of a message 300 that supports pilot ratio adaptation in accordance with various aspects of the present disclosure. In some examples, message 300 may implement aspects of wireless communications system 100. For example, message 300 may be an example of a message transmitted or received by a wireless device, such as a UE 115 or base station 105 as described with reference to FIGS. 1 and 2. Message 300 may illustrate an example of a message that utilizes an adjustable pilot ratio based on a transmission configuration.

In some examples, message 300 may include a long burst 305 followed by a one-symbol burst 310 (e.g., a one-symbol short-burst). One-symbol burst 310 may include one or more reference signals (e.g., pilots 315) that are multiplexed with data 320, and may be included within a single modulation symbol (e.g., an OFDM symbol). In such cases, pilots 315 and data 320 may be multiplexed using FDM, and may be associated with a frequency pattern 325 which may be used for adjusting the pilot ratio. For instance, when determining an adjustable pilot ratio for one-symbol burst 310, different frequency patterns 325 may be used to adjust the pilot ratio. As an example, the frequency pattern may include a size of a comb-type pilot arrangement (e.g., a uniform arrangement of pilots 315 in certain frequency bands), where different comb sizes may be utilized to flexibly adjust the pilot ratio when multiplexing pilots 315 and data 320 using FDM. In such cases, a transmission configuration used for transmission or reception of message 300 may be used to determine the frequency pattern 325 (and the adjustable pilot ratio) used in one-symbol burst 310.

Figure 4:
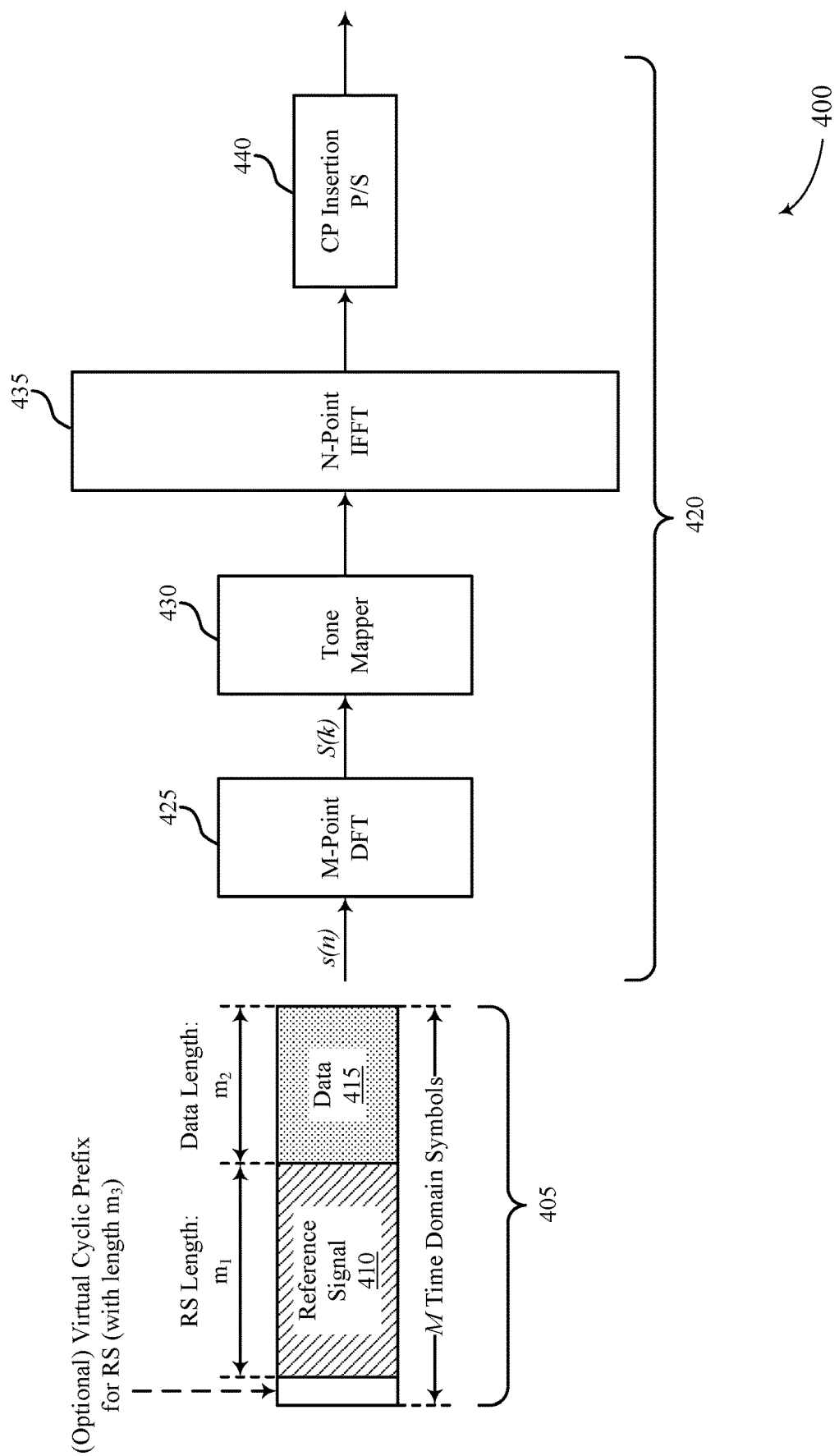
FIG. 4 illustrates an example of a virtual time division multiplexing (TDM) configuration for a one-symbol burst that supports pilot ratio adaptation in accordance with aspects of the present disclosure.

FIG. 4 illustrates an example of a virtual TDM configuration 400 for a one symbol burst that supports pilot ratio adaptation in accordance with various aspects of the present disclosure. In some examples, virtual TDM configuration 400 may implement aspects of wireless communications system 100. For example, virtual TDM configuration 400 may be an example of virtual TDM processes for a message 405 transmitted or received by a wireless device, such as a UE 115 or base station 105 as described with reference to FIGS. 1 and 2. Virtual TDM configuration 400 may illustrate an example of a message 405 that utilizes an adjustable pilot ratio based on a transmission configuration.

Message 405, may include reference signal 410 multiplexed in time with data 415 (e.g., where the information bits are virtually multiplexed in time prior to processing through a transmitter chain 420 and transmitted on a set of physical resources). Reference signal 410 may be associated with a length of $m_1$ and data 415 may be associated with a length of $m_2$, which may make up portions of a total length of time domain symbols (e.g., represented by M) within message 405.

Upon determining a transmission configuration for communicating with another wireless device, an adjustable pilot ratio may be determined that utilizes an adjustment of the ratio of $m_1$ to M. That is, the size of reference signal 410 within message 405 may be changed such that $m_1/M$ is either larger or smaller based on the transmission configuration. Thus, by changing $m_1$, the pilot ratio for message 405 may be adjusted. Upon the virtual TDM of message 405 such that the pilot ratio is adjusted, message 405 may then be processed through transmitter chain 420. Accordingly, message 405 may be spread to frequency resources at discrete Fourier transform (DFT) component 425, mapped to frequency tones at tone mapper 430, transformed from a frequency domain to a time domain at inverse fast Fourier transform (IFFT) component 435, and then have CPs inserted at CP component 440).

Figure 5:
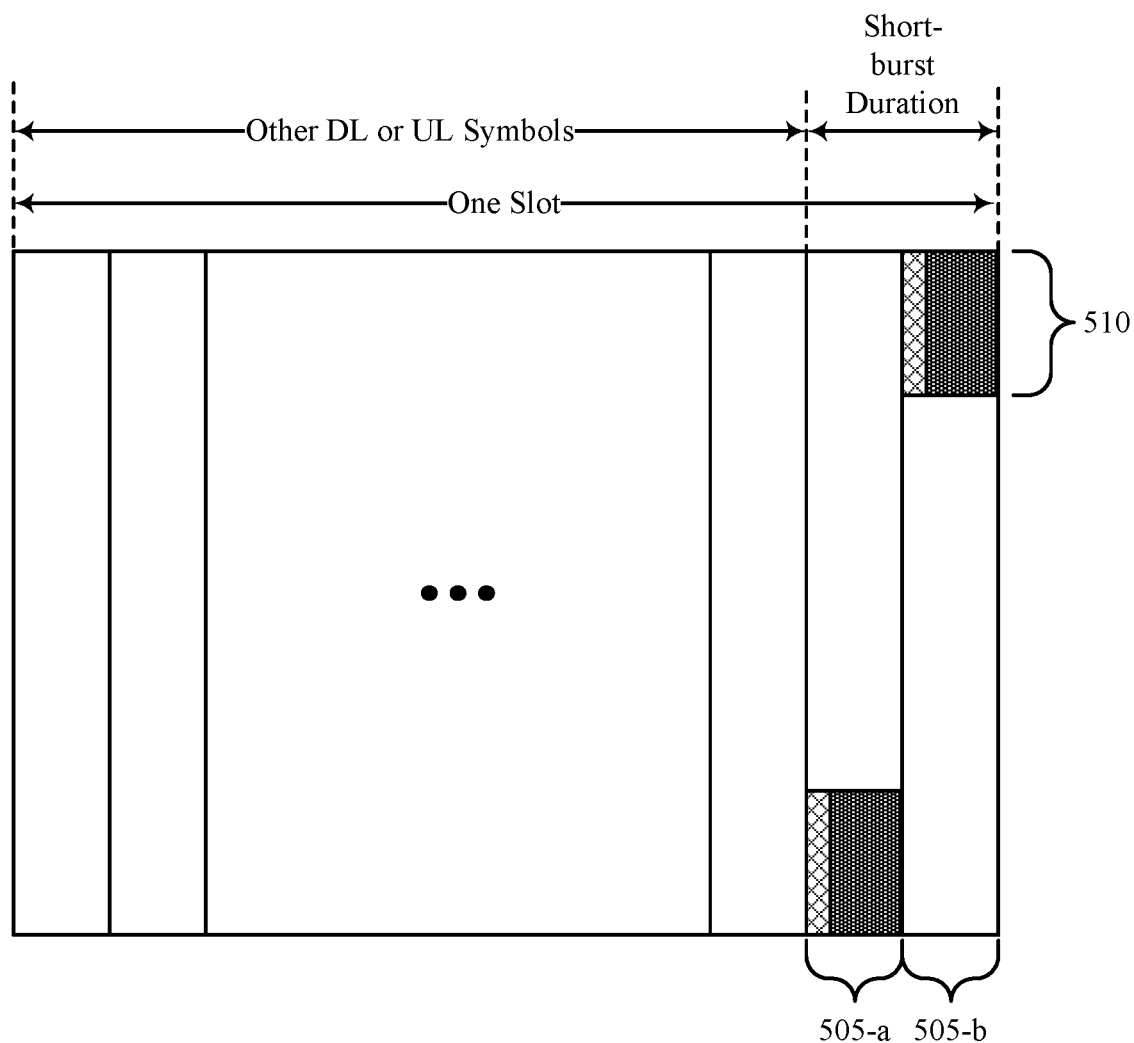
FIGS. 5 and 6 illustrate examples of two-symbol bursts that support pilot ratio adaptation in accordance with aspects of the present disclosure.

FIG. 5 illustrates an example of a two-symbol burst 500 that supports pilot ratio adaptation in accordance with various aspects of the present disclosure. In some examples, two-symbol burst 500 may implement aspects of wireless communications system 100. For example, two-symbol burst 500 may be an example of a message transmitted or received by a wireless device, such as a UE 115 or base station 105 as described with reference to FIGS. 1 and 2.

Two symbol burst 500 may illustrate an example of multiple symbols having an identical pilot pattern having an adjustable pilot ratio.

Two-symbol burst 500 may include a number of modulation symbols 505 that are used for the transmission of a message. In some cases, a pilot pattern 510 may include resources for pilot 515 and data 520, and may be determined based on a transmission configuration used for the transmission of two symbol burst 500. The adjustment of the pilot ratio used for two-symbol burst 500 may be obtained by changing a size of resources used for pilots 515, thereby adjusting a ratio of pilot resources to a total number of allocated resources (e.g., adjusting $m_1/M$, as described above). Additionally, pilot pattern 510 may be applied to both a first modulation symbol 505-a and a second modulation symbol 505-b. In some cases, frequency hopping of pilot pattern 510 may optionally be utilized.

While two-symbol burst 500 illustrates and example of TDM of pilot 515 with data 520, FDM may also be used for the resources including pilot 515 and data 520 (e.g., as described with reference to FIG. 3). In such cases, a frequency pattern, such as a comb size, may accordingly be changed to obtain the adjusted pilot ratio based on the transmission configuration.

Figure 6:
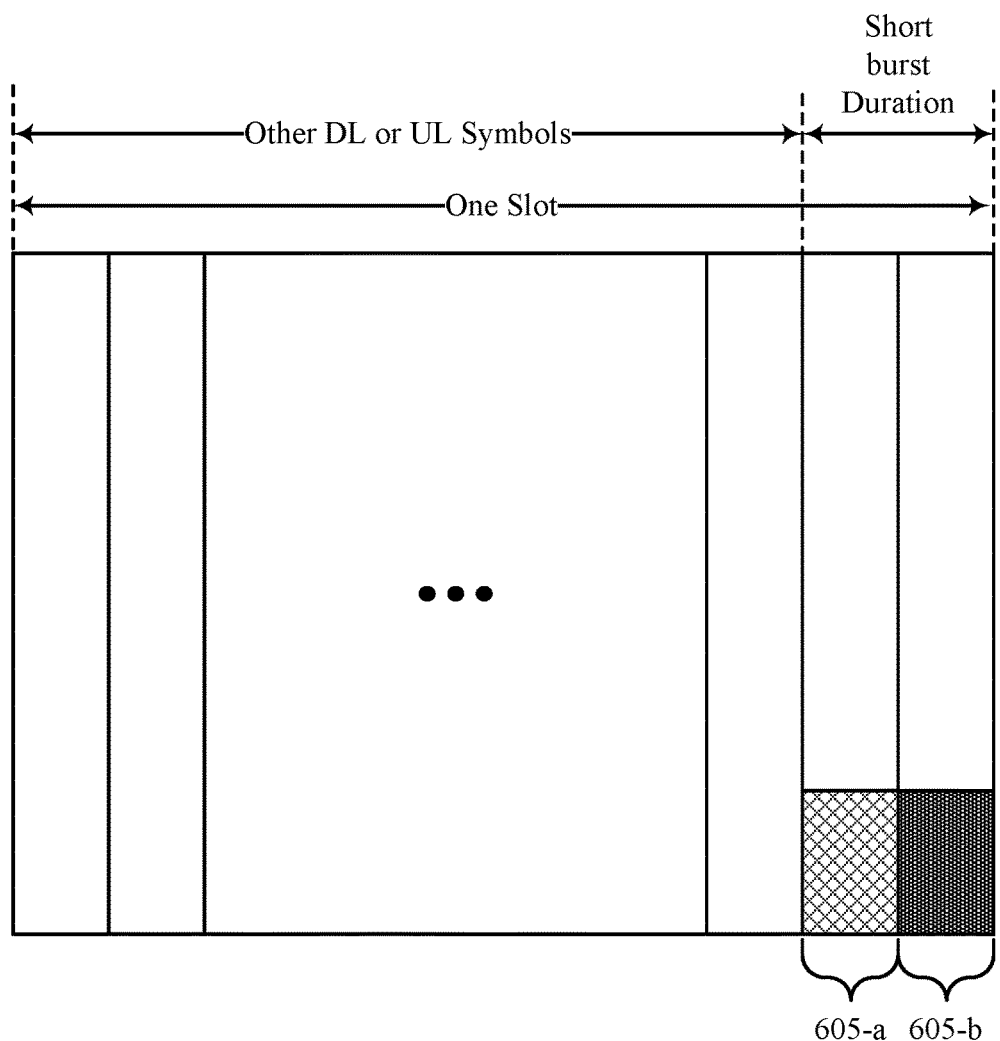

FIG. 6 illustrates an example of a two-symbol burst 600 that supports pilot ratio adaptation in accordance with various aspects of the present disclosure. In some examples, two-symbol burst 600 may implement aspects of wireless communications system 100. For example, two-symbol burst 600 may be an example of a message transmitted or received by a wireless device, such as a UE 115 or base station 105 as described with reference to FIGS. 1 and 2. Two symbol burst 600 may illustrate an example of a different pilot pattern used for different modulation symbols.

Two-symbol burst may include a number of modulation symbols 605 that are used for the transmission of a message. In some cases, different pilot patterns may be determined based on an adjustable pilot ratio used for a certain transmission configuration. For example, a first pilot pattern 610 may include a pilot and data portion of a message and a second pilot pattern 615 may include data. In such cases, first pilot pattern 610 may reflect a one-symbol short burst, (e.g., as described above with reference to FIGS. 3 and 4). First pilot pattern may be applied to first modulation symbol 605-a and second pilot pattern may be applied to second modulation symbol 605-b. The adjustment of the pilot ratio used for two-symbol burst 600 may be obtained by changing a size of resources used for pilots, thereby adjusting a ratio of pilot resources to a total number of allocated resources (e.g., adjusting $m_1/M$).

It is noted that while two-symbol burst 600 illustrates and example of TDM of pilot 615 with data 620, FDM may also be used (e.g., as described with reference to FIG. 3). In such cases, a comb size may be changed to obtain the adjusted pilot ratio based on the transmission configuration.

Figure 7:
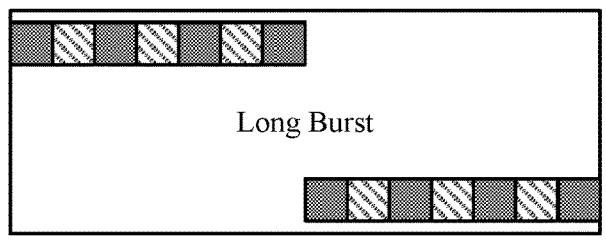
FIG. 7 illustrates an example of long bursts that support pilot ratio adaptation in accordance with aspects of the present disclosure.
Figure 7:
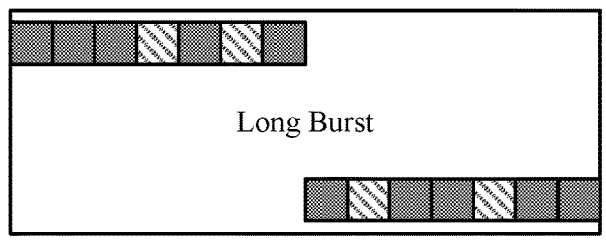
Figure 7:
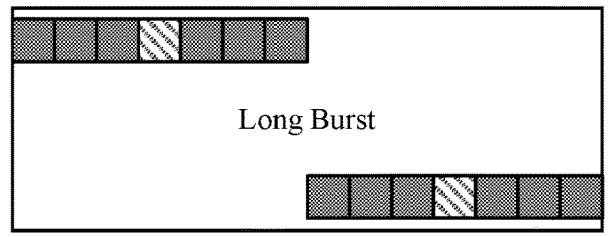

FIG. 7 illustrates examples of long bursts 701, 702, and 703, that support pilot ratio adaptation in accordance with various aspects of the present disclosure. In some examples, long bursts 701, 702, and 703 may implement aspects of wireless communications system 100. For example, long bursts 701, 702, and 703 may be examples of a message transmitted or received by a wireless device, such as a UE 115 or base station 105 as described with reference to FIGS. 1 and 2. Long bursts 701, 702, 703 may be an example of different long bursts having an adjustable pilot ratio based on a transmission configuration.

In some cases, a long burst may include varying number of pilot symbols 705 (e.g., reference signals, such as DMRS) and a varying number of data symbols 710. For instance, a first long burst 701 may include more pilot symbols 705 than second long burst 702 and may accordingly have a larger pilot ratio than second long burst 703. Likewise, second long burst 702 may include more pilot symbols 705 than third long burst 703 and similarly have a larger pilot ratio than third long burst 703. In such cases, the pilot ratio in a long burst 701, 702, and 703 may vary, and may be based on a transmission configuration. For example, first long burst may be used with an MCS associated with QPSK whereas second long burst 702 may be used with an MCS associated with 64-QAM.

In some examples, a pilot ratio in each pilot symbol 705 may also vary. That is, each pilot symbol 705 may also contain data (e.g., as a one-symbol short burst described above). In such cases, each pilot symbol 705 may be representative of a one-symbol short burst, and may respectively include an adjustable pilot ratio that is adjusted using the FDM and/or virtual TDM techniques described above.

Figure 8:
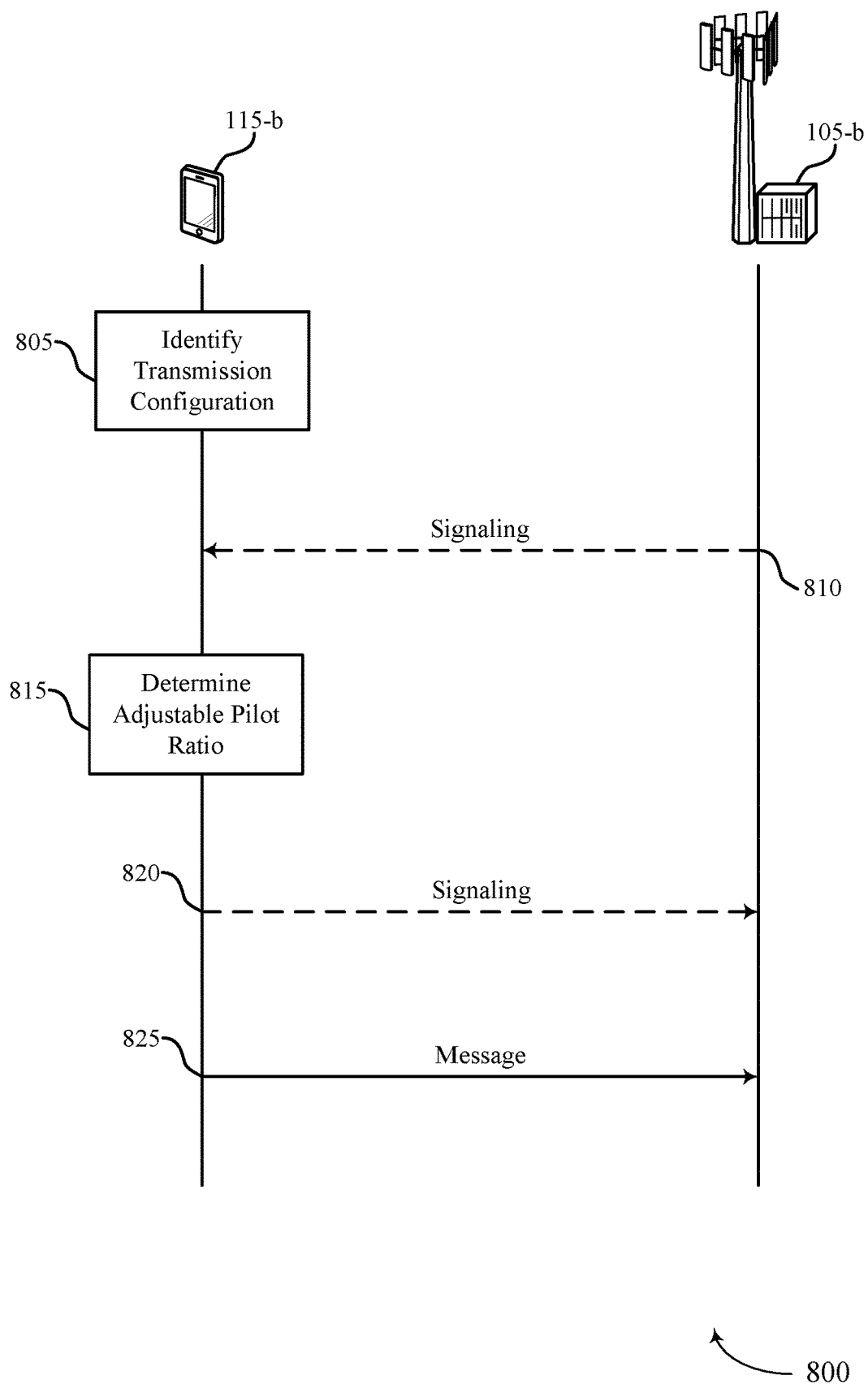
FIG. 8 illustrates an example of a process flow in a system that supports pilot ratio adaptation in accordance with aspects of the present disclosure.

FIG. 8 illustrates an example of a process flow 800 in a system that supports pilot ratio adaptation in accordance with various aspects of the present disclosure. In some examples, process flow 800 may implement aspects of wireless communications system 100. For example, process flow may be an example of communications between wireless devices, such as UE 115-b and base station 105-b, which may be examples of the corresponding devices described with reference to FIGS. 1 and 2. The techniques described below with reference to methods performed by UE 115-b may also be performed by base station 105-b, and vice versa. Process flow may be an example of the use of an adjustable pilot ratio based on a transmission configuration.

At 805, UE 115-b may identify a transmission configuration for a message that includes one or more reference signals (e.g., pilots) and data. In some cases, the transmission configuration includes at least an MCS, a number of MIMO layers, a number of antennas used, a number of allocated RBs, a narrowband transmission, a wideband transmission, or any combination thereof. In some examples, the message may include a one-symbol burst, a two-symbol burst, or a long burst.

In some examples, UE 115-b may optionally receive signaling that indicates an adjustable pilot ratio at 810. That is, base station 105-b may have identified a transmission configuration and may provide explicit signaling of pilot ratios to be used for communications. At 815, UE 115-b may determine an adjustable pilot ratio based on the identified transmission configuration (e.g., either implicitly or based on the received signaling). In some cases, determining the adjustable pilot ratio may be based on the received signaling from base station 105-b.

In some cases, at 820, UE 115-b may optionally transmit signaling that indicated the adjustable pilot ratio to base station 105-b. In some examples, UE 115-b may determine a frequency pattern for the one or more reference signals and the data based on the determined adjustable pilot ratio. UE 115-a may then multiplex the one or more reference signals and the data using FDM in accordance with the determined frequency pattern. In some cases, the frequency pattern may include a comb-type pilot arrangement size. Additionally or alternatively, UE 115-b may determine a ratio of a reference signal length to a total message length based on the adjustable pilot ratio and may multiplex the one or more reference signals and the data using virtual TDM in accordance with the determined ratio. In some examples, UE 115-b may determine a pilot pattern for the message based on the adjustable pilot ratio. UE 115-*b* may additionally or alternatively determine a first pilot pattern and a second pilot pattern for the message based on the adjustable pilot ratio. The first pilot pattern may include the one or more reference signals and the data, and the second pilot pattern may include the data.

At 825, UE 115-*b* may transmit the message using the determined adjustable pilot ratio. In some cases, UE 115-*b* may transmit the message in a first modulation symbol and a second modulation symbol, wherein the determined pilot pattern is applied to both the first modulation symbol and the second modulation symbol. Additionally or alternatively, UE 115-*b* may transmit the message in a first modulation symbol and a second modulation symbol, wherein the first pilot pattern is applied to the first modulation symbol and the second pilot pattern is applied to the second modulation symbol. In some examples, UE 115-*b* may transmit the message over a plurality of symbols using the determined adjustable pilot ratio, wherein respective modulation symbols of the plurality of symbols comprise the one or more reference signals, the data, or a combination thereof. In some cases, there may be a varying number of modulation symbols that include the one or more reference signals, the data, or both.

Figure 9:
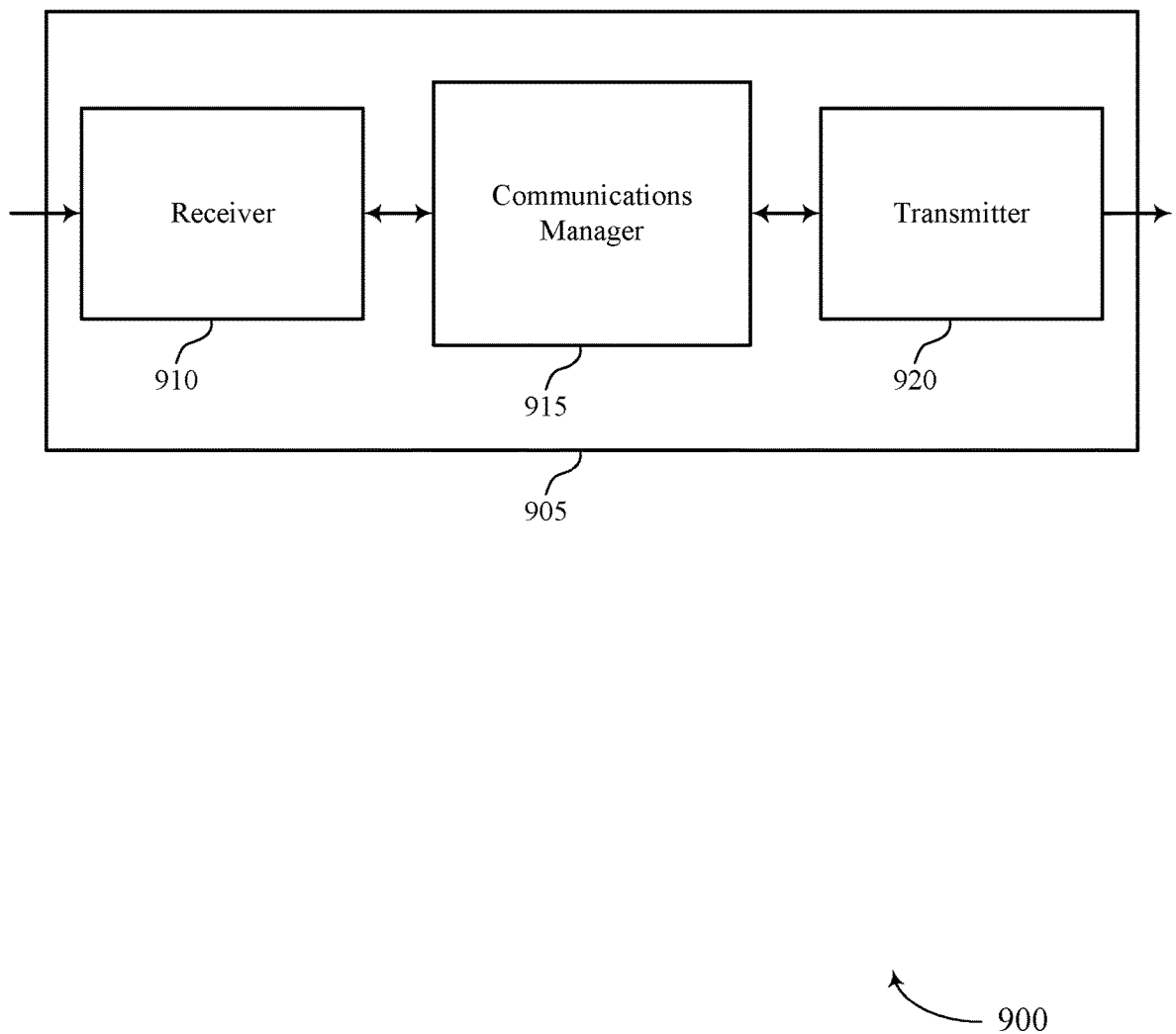
FIGS. 9 through 11 show block diagrams of a device that supports pilot ratio adaptation in accordance with aspects of the present disclosure.

FIG. 9 shows a block diagram 900 of a wireless device 905 that supports pilot ratio adaptation in accordance with aspects of the present disclosure. Wireless device 905 may be an example of aspects of a UE 115 or base station 105 as described herein. Wireless device 905 may include receiver 910, communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to pilot ratio adaptation). Information may be passed on to other components of the device. The receiver 910 may be an example of aspects of the transceiver 1235 described with reference to FIG. 12. The receiver 910 may utilize a single antenna or a set of antennas.

Communications manager 915 may be an example of aspects of the communications manager 1215 described with reference to FIG. 12. Communications manager 915 and/or at least some of its various sub-components may be implemented in hardware, software executed by a processor, firmware, or any combination thereof. If implemented in software executed by a processor, the functions of the communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 915 and/or at least some of its various sub-components may be physically located at various positions, including being distributed such that portions of functions are implemented at different physical locations by one or more physical devices. In some examples, communications manager 915 and/or at least some of its various sub-components may be a separate and distinct component in accordance with various aspects of the present disclosure. In other examples, communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 915 may identify a transmission configuration for a message that includes one or more reference signals and data and determine an adjustable pilot ratio for the message based on the identified transmission configuration.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
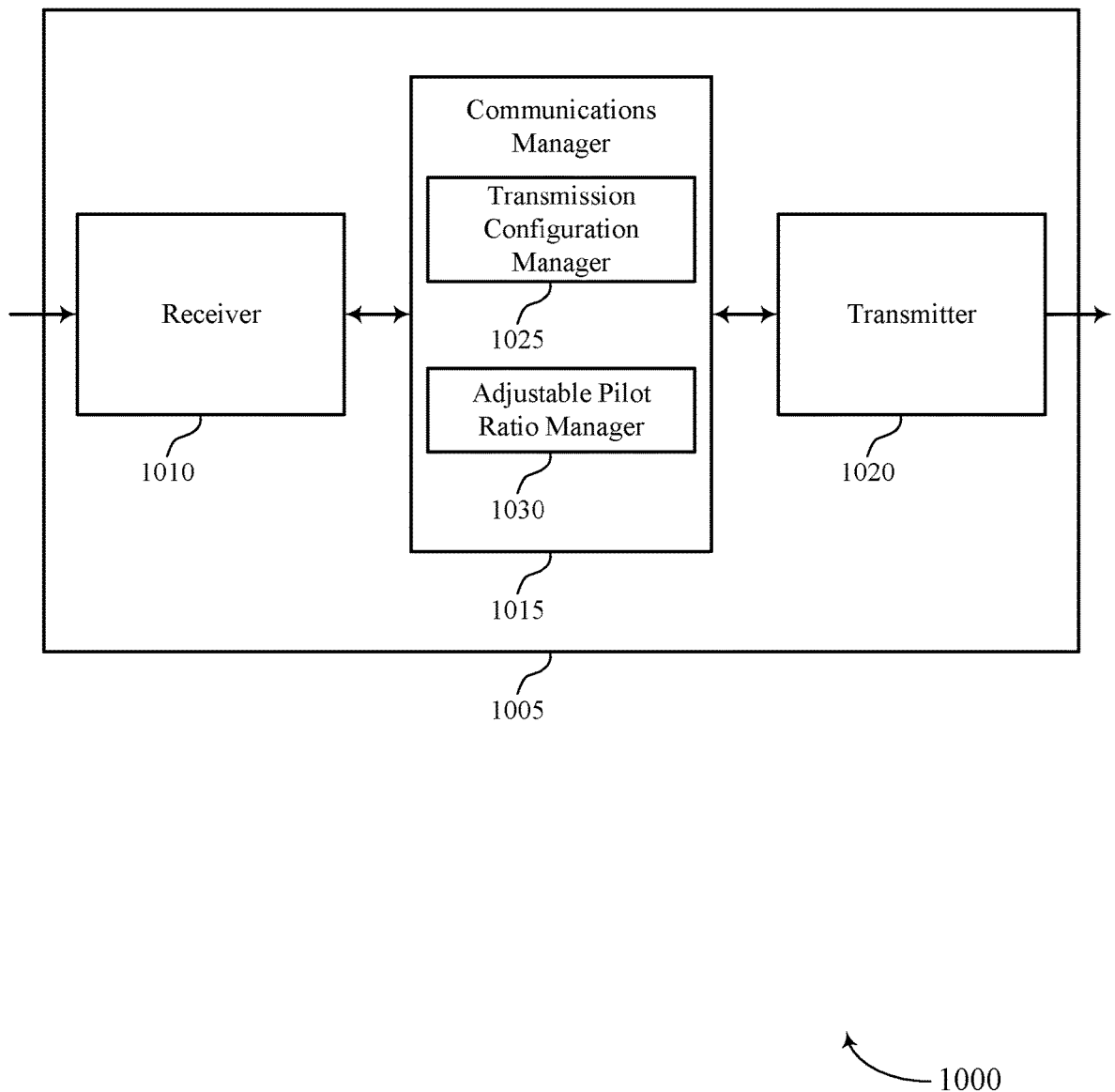

FIG. 10 shows a block diagram 1000 of a wireless device 1005 that supports pilot ratio adaptation in accordance with aspects of the present disclosure. Wireless device 1005 may be an example of aspects of a wireless device 905 or a UE 115 or base station 105 as described with reference to FIG. 9. Wireless device 1005 may include receiver 1010, communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to pilot ratio adaptation). Information may be passed on to other components of the device. The receiver 1010 may be an example of aspects of the transceiver 1235 described with reference to FIG. 12. The receiver 1010 may utilize a single antenna or a set of antennas.

Communications manager 1015 may be an example of aspects of the communications manager 1215 described with reference to FIG. 12. Communications manager 1015 may also include transmission configuration manager 1025 and adjustable pilot ratio manager 1030.

Transmission configuration manager 1025 may identify a transmission configuration for a message that includes one or more reference signals and data. In some cases, the transmission configuration includes at least an MCS, a number of MIMO layers, a number of antennas used, a number of allocated RBs, a narrowband transmission, a wideband transmission, or any combination thereof.

Adjustable pilot ratio manager 1030 may determine an adjustable pilot ratio for the message based on the identified transmission configuration and determine a ratio of a reference signal length to a total message length based on the adjustable pilot ratio. In some cases, determining the adjustable pilot ratio includes: receiving signaling that indicates the adjustable pilot ratio from another device.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
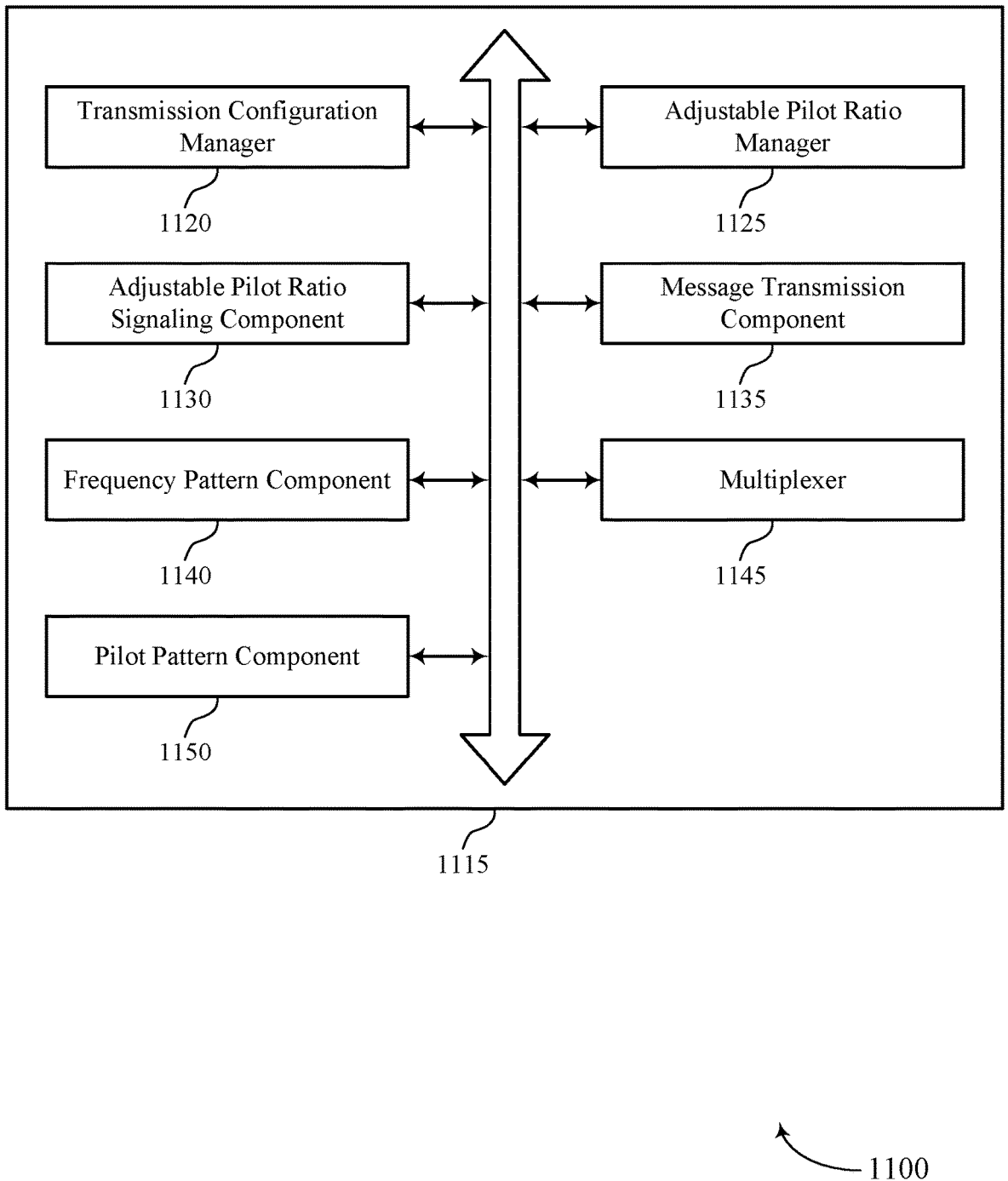

FIG. 11 shows a block diagram 1100 of a communications manager 1115 that supports pilot ratio adaptation in accordance with aspects of the present disclosure. The communications manager 1115 may be an example of aspects of a communications manager 915, a communications manager 1015, or a communications manager 1215 described with reference to FIGS. 9, 10, and 12. The communications manager 1115 may include transmission configuration manager 1120, adjustable pilot ratio manager 1125, adjustable pilot ratio signaling component 1130, message transmission component 1135, frequency pattern component 1140, multiplexer 1145, and pilot pattern component 1150. Each of these modules may communicate, directly or indirectly, with one another (e.g., via one or more buses).

Transmission configuration manager 1120 may identify a transmission configuration for a message that includes one or more reference signals and data. In some cases, the transmission configuration includes at least a MCS, a number of MIMO layers, a number of antennas used, a number of allocated RBs, a narrowband transmission, a wideband transmission, or any combination thereof.

Adjustable pilot ratio manager 1125 may determine an adjustable pilot ratio for the message based on the identified transmission configuration and determine a ratio of a reference signal length to a total message length based on the adjustable pilot ratio. In some cases, determining the adjustable pilot ratio includes: receiving signaling that indicates the adjustable pilot ratio from another device. Adjustable pilot ratio signaling component 1130 may transmit signaling that indicates the determined adjustable pilot ratio.

Message transmission component 1135 may transmit the message using the determined adjustable pilot ratio. In some cases, message transmission component 1135 may transmit the message in a first modulation symbol and a second modulation symbol, where the determined pilot pattern is applied to both the first modulation symbol and the second modulation symbol. Additionally or alternatively, message transmission component 1135 may transmit the message in a first modulation symbol and a second modulation symbol, where the first pilot pattern is applied to the first modulation symbol and the second pilot pattern is applied to the second modulation symbol. In some cases, message transmission component 1135 may transmit the message over a set of symbols using the determined adjustable pilot ratio, where respective modulation symbols of the set of symbols include the one or more reference signals, the data, or a combination thereof. In some cases, the message includes a one-symbol burst, a two-symbol burst, or a long burst. In some aspects, a variable number of the respective modulation symbols include the one or more reference signals.

Frequency pattern component 1140 may determine a frequency pattern for the one or more reference signals and the data based on the determined adjustable pilot ratio. In some cases, the frequency pattern includes a comb-type pilot arrangement size. Multiplexer 1145 may multiplex the one or more reference signals and the data using FDM in accordance with the determined frequency pattern. Additionally or alternatively, multiplexer 1145 may multiplex the one or more reference signals and the data using virtual TDM in accordance with the determined ratio.

Pilot pattern component 1150 may determine a pilot pattern for the message based on the adjustable pilot ratio and determine a first pilot pattern and a second pilot pattern for the message based on the adjustable pilot ratio. In some cases, the first pilot pattern includes the one or more reference signals and the data, and where the second pilot pattern includes the data.

Figure 12:
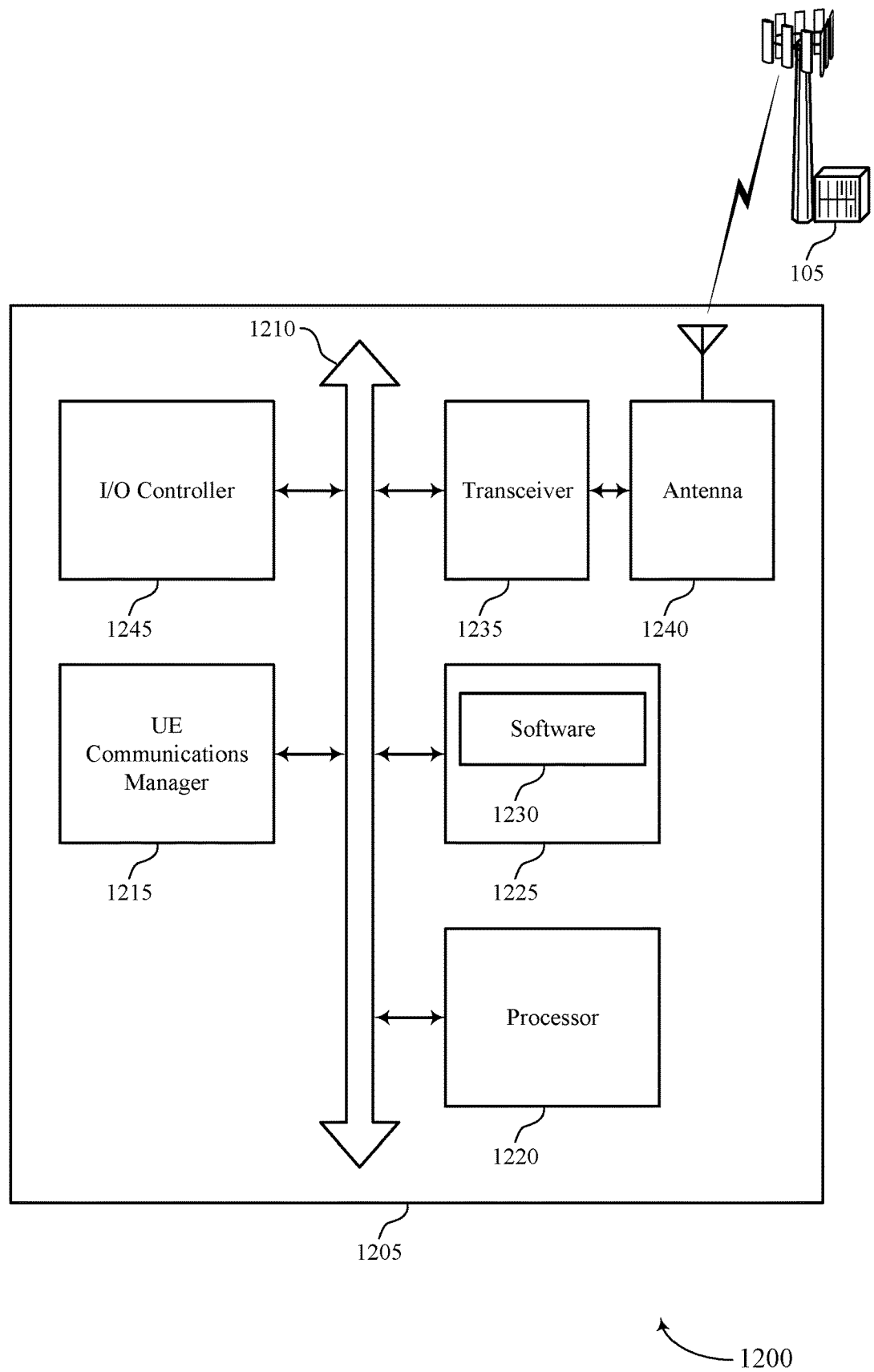
FIG. 12 illustrates a block diagram of a system including a user equipment (UE) that supports pilot ratio adaptation in accordance with aspects of the present disclosure.

FIG. 12 shows a diagram of a system 1200 including a device 1205 that supports pilot ratio adaptation in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting pilot ratio adaptation).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support pilot ratio adaptation. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
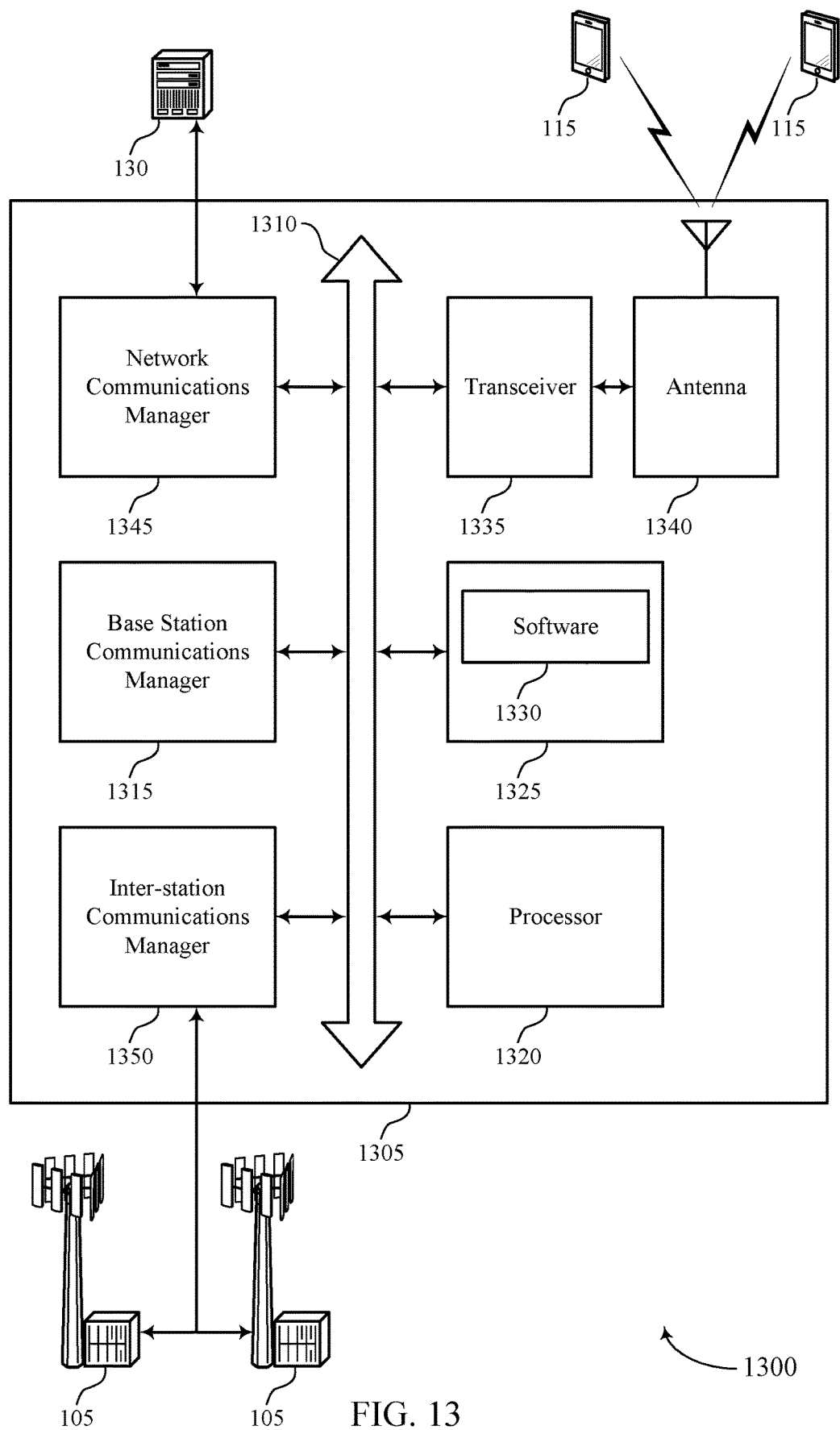
FIG. 13 illustrates a block diagram of a system including a base station that supports pilot ratio adaptation in accordance with aspects of the present disclosure.

FIG. 13 shows a diagram of a system 1300 including a device 1305 that supports pilot ratio adaptation in accordance with aspects of the present disclosure. Device 1305 may be an example of or include the components of wireless device 1005, wireless device 1105, or a base station 105 as described above, e.g., with reference to FIGS. 10 and 11. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting pilot ratio adaptation).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support pilot ratio adaptation. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
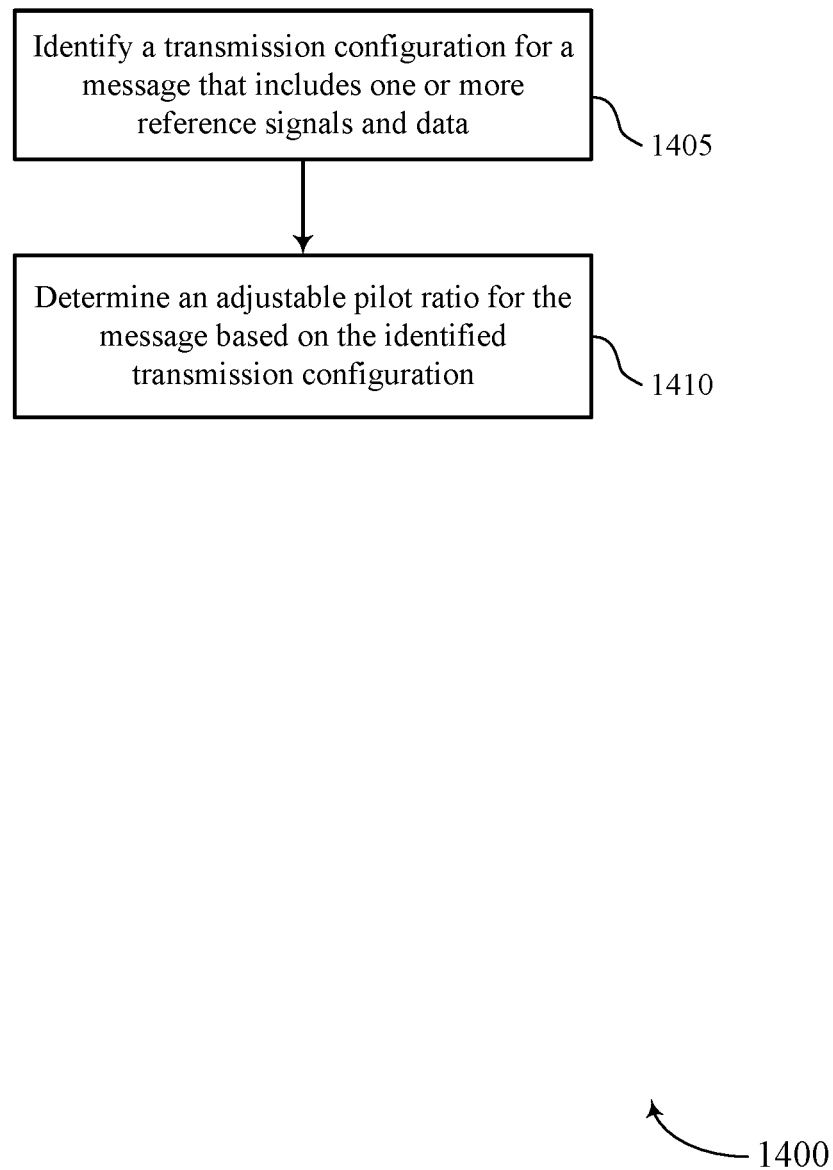
FIGS. 14 through 18 illustrate methods for pilot ratio adaptation in accordance with aspects of the present disclosure.

FIG. 14 shows a flowchart illustrating a method 1400 for pilot ratio adaptation in accordance with aspects of the present disclosure. The operations of method 1400 may be implemented by a UE 115 or base station 105 or its components as described herein. For example, the operations of method 1400 may be performed by a communications manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1405 the UE 115 or base station 105 may identify a transmission configuration for a message that includes one or more reference signals and data. The operations of block 1405 may be performed according to the methods described herein. In certain examples, aspects of the operations of block 1405 may be performed by a transmission configuration manager as described with reference to FIGS. 9 through 11.

At block 1410 the UE 115 or base station 105 may determine an adjustable pilot ratio for the message based at least in part on the identified transmission configuration. The operations of block 1410 may be performed according to the methods described herein. In certain examples, aspects of the operations of block 1410 may be performed by an adjustable pilot ratio manager as described with reference to FIGS. 9 through 11.

Figure 15:
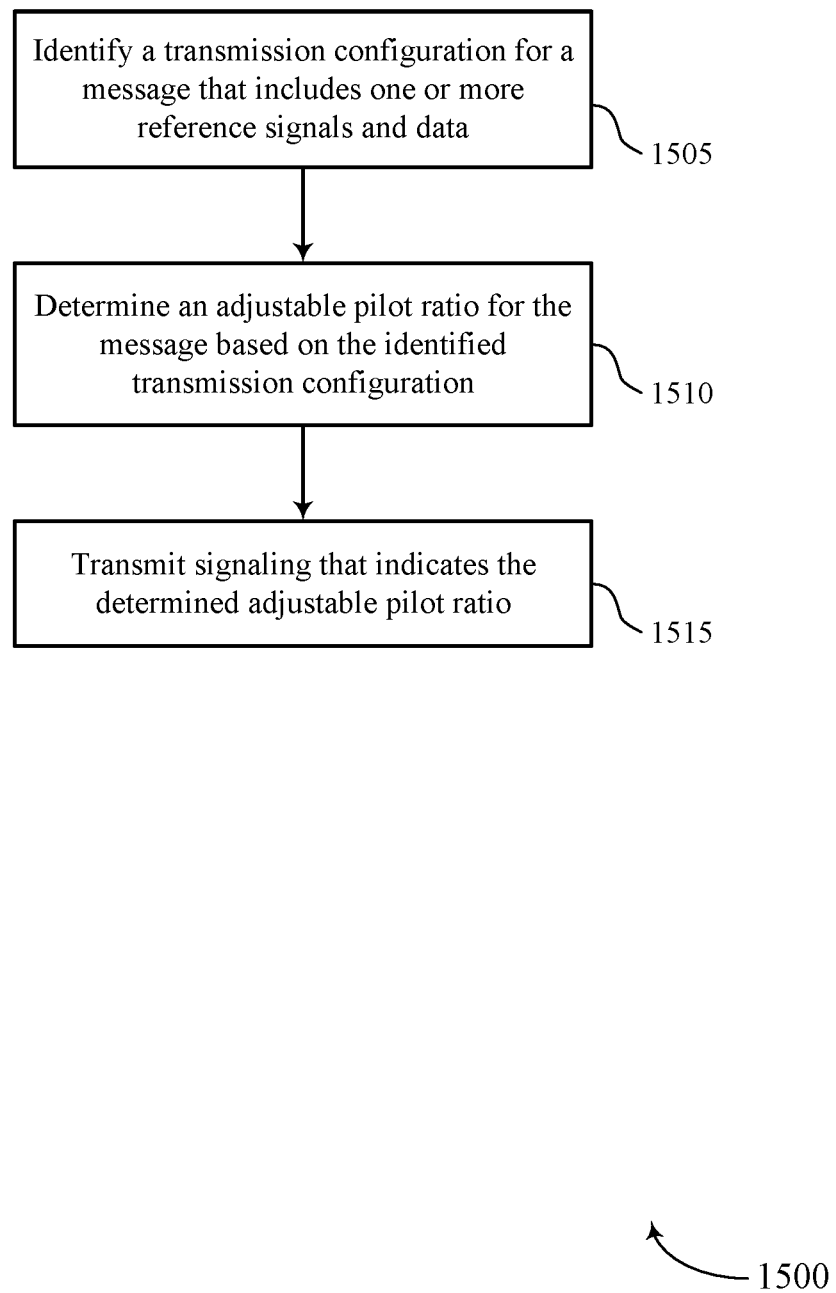

FIG. 15 shows a flowchart illustrating a method 1500 for pilot ratio adaptation in accordance with aspects of the present disclosure. The operations of method 1500 may be implemented by a UE 115 or base station 105 or its components as described herein. For example, the operations of method 1500 may be performed by a communications manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1505 the UE 115 or base station 105 may identify a transmission configuration for a message that includes one or more reference signals and data. The operations of block 1505 may be performed according to the methods described herein. In certain examples, aspects of the operations of block 1505 may be performed by a transmission configuration manager as described with reference to FIGS. 9 through 11.

At block 1510 the UE 115 or base station 105 may determine an adjustable pilot ratio for the message based at least in part on the identified transmission configuration. The operations of block 1510 may be performed according to the methods described herein. In certain examples, aspects of the operations of block 1510 may be performed by an adjustable pilot ratio manager as described with reference to FIGS. 9 through 11.

At block 1515 the UE 115 or base station 105 may transmit signaling that indicates the determined adjustable pilot ratio. The operations of block 1515 may be performed according to the methods described herein. In certain examples, aspects of the operations of block 1515 may be performed by an adjustable pilot ratio signaling component as described with reference to FIGS. 9 through 11.

Figure 16:
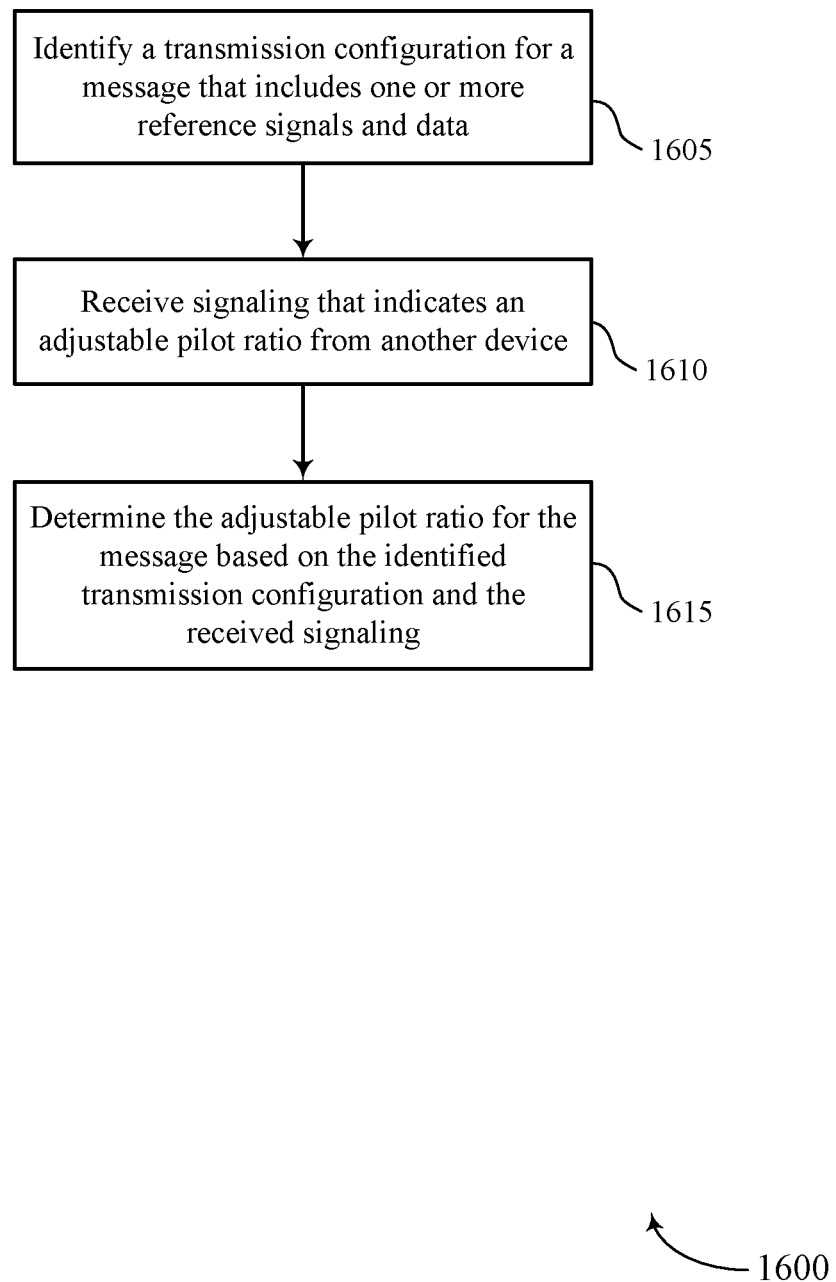

FIG. 16 shows a flowchart illustrating a method 1600 for pilot ratio adaptation in accordance with aspects of the present disclosure. The operations of method 1600 may be implemented by a UE 115 or base station 105 or its components as described herein. For example, the operations of method 1600 may be performed by a communications manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1605 the UE 115 or base station 105 may identify a transmission configuration for a message that includes one or more reference signals and data. The operations of block 1605 may be performed according to the methods described herein. In certain examples, aspects of the operations of block 1605 may be performed by a transmission configuration manager as described with reference to FIGS. 9 through 11.

At block 1610 the UE 115 or base station 105 may receive signaling that indicates the adjustable pilot ratio from another device. The operations of block 1610 may be performed according to the methods described herein. In certain examples, aspects of the operations of block 1610 may be performed by an adjustable pilot ratio manager as described with reference to FIGS. 9 through 11.

At block 1615 the UE 115 or base station 105 may determine an adjustable pilot ratio for the message based at least in part on the identified transmission configuration and the received signaling. The operations of block 1615 may be performed according to the methods described herein. In certain examples, aspects of the operations of block 1615 may be performed by an adjustable pilot ratio manager as described with reference to FIGS. 9 through 11.

Figure 17:
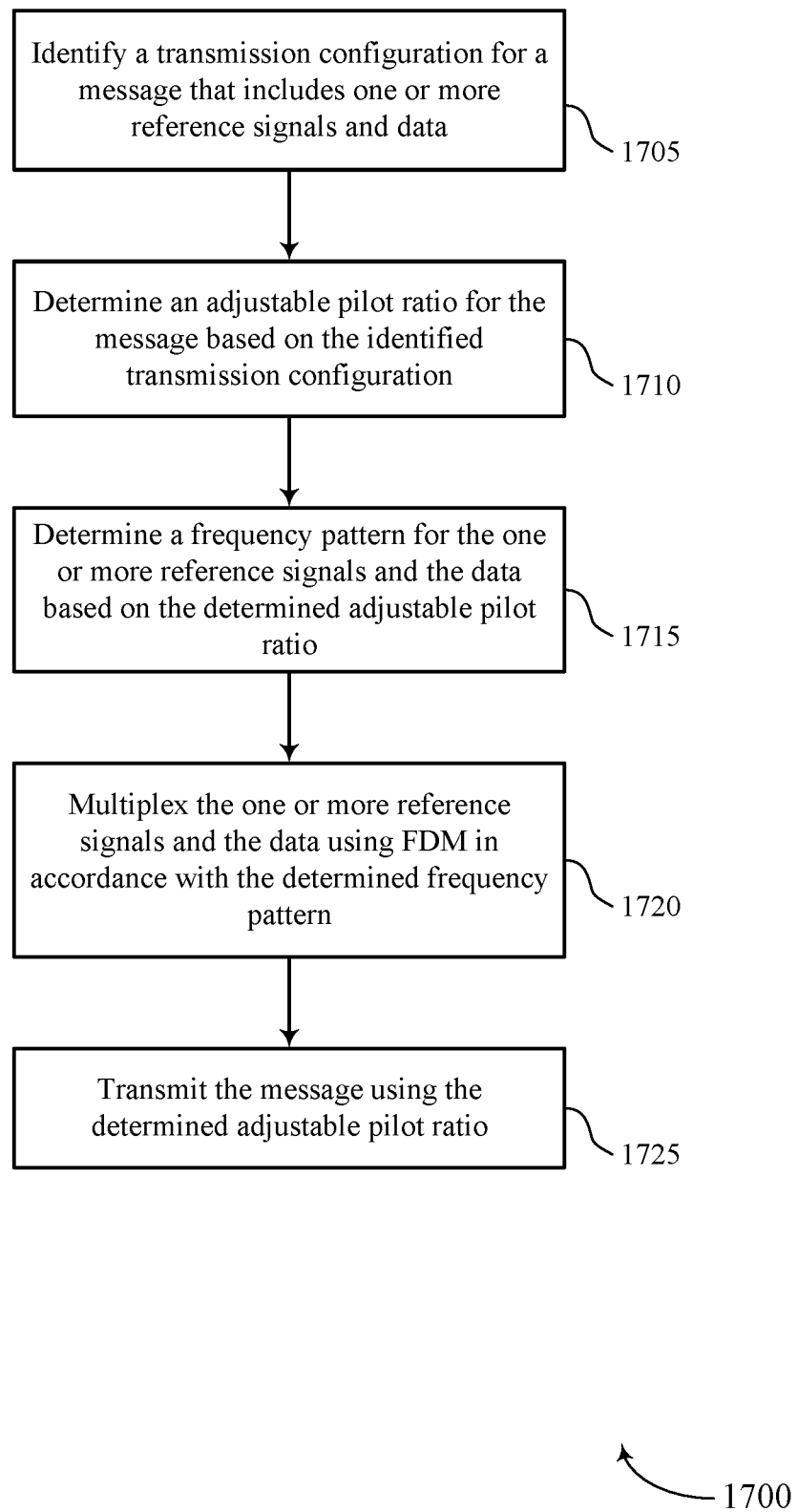

FIG. 17 shows a flowchart illustrating a method 1700 for pilot ratio adaptation in accordance with aspects of the present disclosure. The operations of method 1700 may be implemented by a UE 115 or base station 105 or its components as described herein. For example, the operations of method 1700 may be performed by a communications manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1705 the UE 115 or base station 105 may identify a transmission configuration for a message that includes one or more reference signals and data. The operations of block 1705 may be performed according to the methods described herein. In certain examples, aspects of the operations of block 1705 may be performed by a transmission configuration manager as described with reference to FIGS. 9 through 11.

At block 1710 the UE 115 or base station 105 may determine an adjustable pilot ratio for the message based at least in part on the identified transmission configuration. The operations of block 1710 may be performed according to the methods described herein. In certain examples, aspects of the operations of block 1710 may be performed by an adjustable pilot ratio manager as described with reference to FIGS. 9 through 11.

At block 1715 the UE 115 or base station 105 may determine a frequency pattern for the one or more reference signals and the data based on the determined adjustable pilot ratio. The operations of block 1715 may be performed according to the methods described herein. In certain examples, aspects of the operations of block 1715 may be performed by a frequency pattern component as described with reference to FIGS. 9 through 11.

At block 1720 the UE 115 or base station 105 may multiplex the one or more reference signals and the data using FDM in accordance with the determined frequency pattern. The operations of block 1720 may be performed according to the methods described herein. In certain examples, aspects of the operations of block 1720 may be performed by a multiplexer as described with reference to FIGS. 9 through 11.

At block 1725 the UE 115 or base station 105 may transmit the message using the determined adjustable pilot ratio. The operations of block 1725 may be performed according to the methods described herein. In certain examples, aspects of the operations of block 1725 may be performed by a message transmission component as described with reference to FIGS. 9 through 11.

Figure 18:
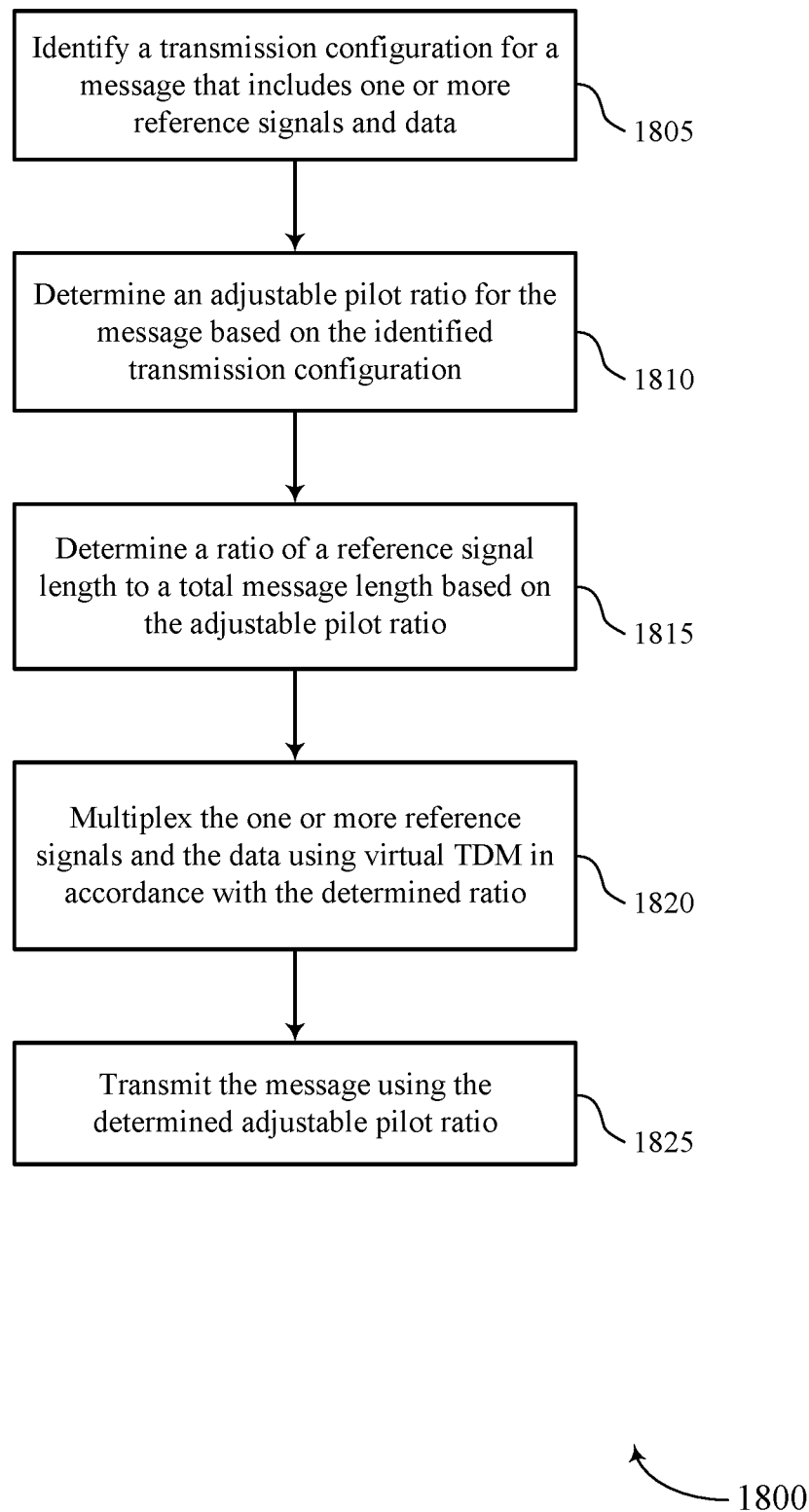

FIG. 18 shows a flowchart illustrating a method 1800 for pilot ratio adaptation in accordance with aspects of the present disclosure. The operations of method 1800 may be implemented by a UE 115 or base station 105 or its components as described herein. For example, the operations of method 1800 may be performed by a communications manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1805 the UE 115 or base station 105 may identify a transmission configuration for a message that includes one or more reference signals and data. The operations of block 1805 may be performed according to the methods described herein. In certain examples, aspects of the operations of block 1805 may be performed by a transmission configuration manager as described with reference to FIGS. 9 through 11.

At block 1810 the UE 115 or base station 105 may determine an adjustable pilot ratio for the message based at least in part on the identified transmission configuration. The operations of block 1810 may be performed according to the methods described herein. In certain examples, aspects of the operations of block 1810 may be performed by an adjustable pilot ratio manager as described with reference to FIGS. 9 through 11.

At block 1815 the UE 115 or base station 105 may determine a ratio of a reference signal length to a total message length based at least in part on the adjustable pilot ratio. The operations of block 1815 may be performed according to the methods described herein. In certain examples, aspects of the operations of block 1815 may be performed by an adjustable pilot ratio manager as described with reference to FIGS. 9 through 11.

At block 1820 the UE 115 or base station 105 may multiplex the one or more reference signals and the data using virtual TDM in accordance with the determined ratio. The operations of block 1820 may be performed according to the methods described herein. In certain examples, aspects of the operations of block 1820 may be performed by a multiplexer as described with reference to FIGS. 9 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed and/or unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a first transmission configuration for a first set of one or more reference signals and data;
   determining a first adjustable pilot ratio for the first set of one or more reference signals and data based at least in part on the identified first transmission configuration;
   transmitting, within a first slot, the first set of one or more reference signals and data using the determined first adjustable pilot ratio;
   identifying a second transmission configuration for a second set of one or more reference signals and data;
   adjusting the first adjustable pilot ratio for the second set of one or more reference signals and data based at least in part on the identified second transmission configuration; and
   transmitting, within a second slot, the second set of one or more reference signals and data using the adjusted first adjustable pilot ratio.

2. The method of claim 1, further comprising:
   transmitting signaling that indicates the determined first adjustable pilot ratio.

3. The method of claim 1, wherein determining the first adjustable pilot ratio comprises:
   receiving signaling that indicates the first adjustable pilot ratio from another device; and
   determining the first adjustable pilot ratio based on the received signaling that indicates the first adjustable pilot ratio.

4. The method of claim 1, further comprising:
   determining a frequency pattern for the one or more reference signals and the data based on the determined first adjustable pilot ratio; and
   multiplexing the one or more reference signals and the data using frequency division multiplexing (FDM) in accordance with the determined frequency pattern.

5. The method of claim 4, wherein the frequency pattern comprises a comb-type pilot arrangement size.

6. The method of claim 1, further comprising:
determining a ratio of a reference signal length to a total length of the first set of one or more reference signals and data based at least in part on the first adjustable pilot ratio; and
multiplexing the one or more reference signals and the data using virtual time division multiplexing (TDM) in accordance with the determined ratio.

7. The method of claim 1, further comprising:
determining a time domain pilot pattern for the first set of one or more reference signals and data based on the first adjustable pilot ratio; and
transmitting the first set of one or more reference signals and data in a first modulation symbol and a second modulation symbol, wherein the determined time domain pilot pattern is applied to each of the first modulation symbol and the second modulation symbol.

8. The method of claim 1, further comprising:
determining a first pilot pattern and a second pilot pattern for the first set of one or more reference signals and data based on the first adjustable pilot ratio; and
transmitting the first set of one or more reference signals and data in a first modulation symbol and a second modulation symbol, wherein the first pilot pattern is applied to the first modulation symbol and the second pilot pattern is applied to the second modulation symbol.

9. The method of claim 8, wherein the first pilot pattern comprises the one or more reference signals and the data, and wherein the second pilot pattern comprises the data.

10. The method of claim 1, further comprising:
transmitting the first set of one or more reference signals and data over a plurality of symbols using the determined first adjustable pilot ratio, wherein respective modulation symbols of the plurality of symbols comprise the one or more reference signals, the data, or a combination thereof.

11. The method of claim 10, wherein a variable number of the respective modulation symbols include the one or more reference signals.

12. The method of claim 1, wherein the first set of one or more reference signals and data comprises a one-symbol burst, a two-symbol burst, or a long burst.

13. The method of claim 1, wherein the first transmission configuration comprises at least a modulation and coding scheme (MCS), a number of multiple-input multiple output (MIMO) layers, a number of antennas used, a number of allocated resource blocks (RBs), a narrowband transmission, a wideband transmission, or any combination thereof.

14. An apparatus for wireless communication, comprising:
a processor;
memory in electronic communication with the processor; and
instructions stored in the memory and operable, when executed by the processor, to cause the apparatus to:
identify a first transmission configuration for a first set of one or more reference signals and data;
determine a first adjustable pilot ratio for the first set of one or more reference signals and data based at least in part on the identified first transmission configuration;
transmit, within a first slot, the first set of one or more reference signals and data using the determined first adjustable pilot ratio;
identify a second transmission configuration for a second set of one or more reference signals and data;
adjust the first adjustable pilot ratio for the second set of one or more reference signals and data based at least in part on the identified second transmission configuration; and
transmit, within a second slot, the second set of one or more reference signals and data using the adjusted first adjustable pilot ratio.

15. The apparatus of claim 14, wherein the instructions are executable by the processor to:
transmit signaling that indicates the determined first adjustable pilot ratio.

16. The apparatus of claim 14, wherein the instructions executable by the processor to cause the apparatus to determine the first adjustable pilot ratio comprise instructions executable by the processor to cause the apparatus to:
receive signaling that indicates the first adjustable pilot ratio from another device; and
determine the first adjustable pilot ratio based on the received signaling.

17. The apparatus of claim 14, wherein the instructions are executable by the processor to:
determine a frequency pattern for the one or more reference signals and the data based on the determined first adjustable pilot ratio; and
multiplex the one or more reference signals and the data using frequency division multiplexing (FDM) in accordance with the determined frequency pattern.

18. The apparatus of claim 17, wherein the frequency pattern comprises a comb-type pilot arrangement size.

19. The apparatus of claim 14, wherein the instructions are executable by the processor to:
determine a ratio of a reference signal length to a total length of the set of one or more reference signals and data based at least in part on the first adjustable pilot ratio; and
multiplex the one or more reference signals and the data using virtual time division multiplexing (TDM) in accordance with the determined ratio.

20. The apparatus of claim 14, wherein the instructions are executable by the processor to:
determine a time domain pilot pattern for the first set of one or more reference signals and data based on the first adjustable pilot ratio; and
transmit the first set of one or more reference signals and data in a first modulation symbol and a second modulation symbol, wherein the determined time domain pilot pattern is applied to each of the first modulation symbol and the second modulation symbol.

21. The apparatus of claim 14, wherein the instructions are executable by the processor to:
determine a first pilot pattern and a second pilot pattern for the first set of one or more reference signals and data based on the first adjustable pilot ratio; and
transmit the first set of one or more reference signals and data in a first modulation symbol and a second modulation symbol, wherein the first pilot pattern is applied to the first modulation symbol and the second pilot pattern is applied to the second modulation symbol.

22. The apparatus of claim 21, wherein the first pilot pattern comprises the one or more reference signals and the data, and wherein the second pilot pattern comprises the data.

23. The apparatus of claim 14, wherein the instructions are executable by the processor to:
transmit the first set of one or more reference signals and data over a plurality of symbols using the determined first adjustable pilot ratio, wherein respective modulation symbols of the plurality of symbols comprise the one or more reference signals, the data, or a combination thereof.

24. The apparatus of claim 23, wherein a variable number of the respective modulation symbols include the one or more reference signals.

25. The apparatus of claim 14, wherein the first set of one or more reference signals and data comprises a one-symbol burst, a two-symbol burst, or a long burst.

26. The apparatus of claim 14, wherein the first transmission configuration comprises at least a modulation and coding scheme (MCS), a number of multiple-input multiple output (MIMO) layers, a number of antennas used, a number of allocated resource blocks (RBs), a narrowband transmission, a wideband transmission, or any combination thereof.

27. An apparatus for wireless communication, comprising:
  means for identifying a first transmission configuration for a first set of one or more reference signals and data;
  means for determining a first adjustable pilot ratio for the first set of one or more reference signals and data based at least in part on the identified first transmission configuration;
  means for transmitting, within a first slot, the first set of one or more reference signals and data using the determined first adjustable pilot ratio;
  means for identifying a second transmission configuration for a second set of one or more reference signals and data;
  means for adjusting the first adjustable pilot ratio for the second set of one or more reference signals and data based at least in part on the identified second transmission configuration; and
  means for transmitting, within a second slot, the second set of one or more reference signals and data using the adjusted first adjustable pilot ratio.

28. A non-transitory computer readable medium storing code for wireless communication, the code comprising instructions executable by a processor to:
  identify a first transmission configuration for a first set of one or more reference signals and data;
  determine a first adjustable pilot ratio for the first set of one or more reference signals and data based at least in part on the identified first transmission configuration;
  transmit, within a first slot, the first set of one or more reference signals and data using the determined first adjustable pilot ratio;
  identify a second transmission configuration for a second set of one or more reference signals and data;
  adjust the first adjustable pilot ratio for the second set of one or more reference signals and data based at least in part on the identified second transmission configuration; and
  transmit, within a second slot, the second set of one or more reference signals and data using the adjusted first adjustable pilot ratio.

29. The method of claim 7, wherein the time domain pilot pattern comprises a first pilot pattern applied to the first modulation symbol and a second pilot pattern applied to the second modulation symbol, the first pilot pattern being different from the second pilot pattern.

30. The apparatus of claim 20, wherein the time domain pilot pattern comprises a first pilot pattern applied to the first modulation symbol and a second pilot pattern applied to the second modulation symbol, the first pilot pattern being different from the second pilot pattern.

* * * * *